Sept. 29, 1970 YASUO ISHII 3,531,775

MEMORY APPARATUS FOR RAPID WRITE-IN AND READ-OUT OF INFORMATION

Filed Sept. 27, 1967 14 Sheets-Sheet 1

Sept. 29, 1970 YASUO ISHII 3,531,775

MEMORY APPARATUS FOR RAPID WRITE-IN AND READ-OUT OF INFORMATION

Filed Sept. 27, 1967 14 Sheets-Sheet 2

IMAGINARY PLANE

Sept. 29, 1970 YASUO ISHII 3,531,775

MEMORY APPARATUS FOR RAPID WRITE-IN AND READ-OUT OF INFORMATION

Filed Sept. 27, 1967 14 Sheets-Sheet 6

Sept. 29, 1970 YASUO ISHII 3,531,775

MEMORY APPARATUS FOR RAPID WRITE-IN AND READ-OUT OF INFORMATION

Filed Sept. 27, 1967 14 Sheets-Sheet 11

FIG. 16
| | | | | | |
|---|---|---|---|---|---|
| 3040 | 3041 | 3042 | 3043 | 3034 | 3035 |
| 3140 | 3141 | 3142 | 3143 | 3134 | 3135 |
| 3240 | 3241 | 3242 | 3243 | 3234 | 3235 |
| 3340 | 3341 | 3342 | 3343 | 3334 | 3335 |
| 2440 | 2441 | 2442 | 2443 | 2434 | 2435 |
| 2540 | 2541 | 2542 | 2543 | 2534 | 2535 |
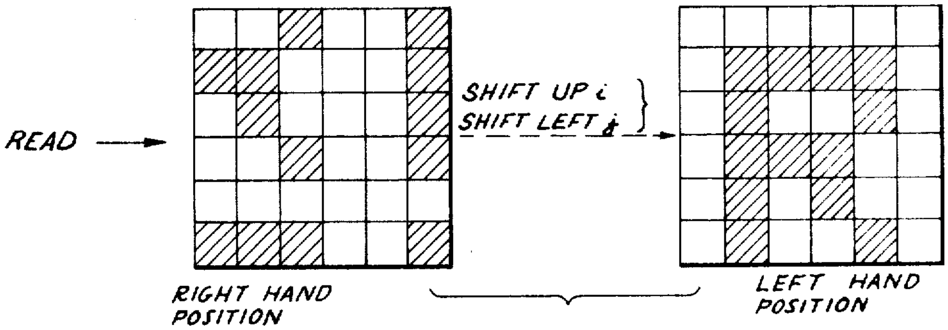
FIG. 17
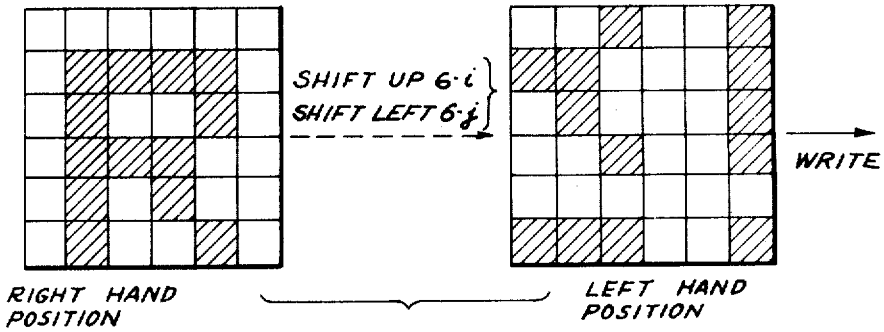
FIG. 18

United States Patent Office 3,531,775
Patented Sept. 29, 1970

3,531,775

MEMORY APPARATUS FOR RAPID WRITE-IN AND READ-OUT OF INFORMATION

Yasuo Ishii, Tokyo, Japan, assignor to Fujitsu Limited, Kawasaki, Japan, a corporation of Japan Filed Sept. 27, 1967, Ser. No. 670,933
Claims priority, application Japan, Sept. 30, 1966, 41/64,478, 41/64,479
Int. Cl. G06f 7/00
U.S. Cl. 340—172.5 4 Claims

ABSTRACT OF THE DISCLOSURE

Each of a plurality of storage units comprises a plurality of memory elements. Each of the memory elements comprises at least a bit of information. The storage units as a whole have a plurality of addresses. A write-in and read-out control circuit includes an arithmetic circuit for selecting one of the addresses of the storage units in a manner whereby a plurality of storage units having the selected address are selected.

DESCRIPTION OF THE INVENTION

The present invention relates to a memory apparatus for rapid write-in and read-out of information. More particularly, the invention relates to an information processing or handling system in which a two-dimensional field of information may be read out simultaneously by a single unit address. The pattern of the two-dimensional information field is stored and read out without deformation.

In known memory apparatus of the type described, each storage unit has a corresponding address or adress information so that a single storage unit may be selected thereby. Access may thus be had to only one designated unit which corresponds to the address of said unit. When two-dimensional information is stored in memory apparatus of this type, it is extremely difficult to provide storage of or access to information without deforming of the pattern of the information. Furthermore, access requires a long period of time. It is extremely difficult to provide access to all of the storage field which stores two-dimensional information desigated by an address for only a single unit. In order to provide access to the entire storage field which stores the two-dimensional information, it is necessary to provide all the address information included in the entire field. The foregoing operation is even more troublesome and difficult, due to the fact that such operation must be performed in successive steps and due to the fact that the addresses of the field in which the two-dimensional information pattern is stored are intermittent rather than serial in disposition.

For the foregoing reasons, in memory apparatus of known type, the pattern of information is divided into the storage units of the memory apparatus in order to permit storage of the two-dimensional information. In other words, the storage units of the memory apparatus are generally in the form of words each comprising a plurality of bits. Thus, as hereinafter described with reference to FIGS. 1 and 2, the information pattern to be stored in the memory apparatus is divided in accordance with the corresponding words before it is stored. Consequently, the space between a pair of arbitrary points in the information and the positions of such point or points are completely changed so that considerable difficulty arises in calculating the relation between such arbitrary points.

A display of cathode ray tube type may be utilized as a peripheral device in an information processing or handling system and it is convenient to utilize such cathode ray tube if the foregoing calculations may be readily accomplished. This is also true for optical character recognition. If, however, memory apparatus of known type is utilized without field modification, it is necessary to provide a converter between the memory apparatus and the cathode ray tube display unit. The converter functions to divide the information patterns into the word units, as hereinbefore described, and to then restore the divided pattern of word units back to its initial undivided condition. It is extremely difficult to provide such a converter with electronic circuit components, since the undertaking is too complex and complicated, and since in known apparatus, the program of the data processing or information system functions as the converter. The preparation of such a program is complex and complicated. Furthermore, during the preparation of the program, considerable errors may be made and the end result is inflexible.

It is thus desirable to provide memory apparatus which may store a pattern of information without changing the space between a pair of arbitrary points in the pattern and without changing the positions of such points. It is also desirable to utilize the address or address information of a single unit to provide access to all the units in a pattern. It is desirable to utilize a single address unit to provide free access to a selected field or pattern of information.

The principal object of the present invention is to provide new and improved memory apparatus for rapid write-in and read-out of information. The memory apparatus of the present invention stores an information pattern without variation of the relation between the positions of a pair of arbitrary points in the pattern. The memory apparatus of the present invention utilizes the address information of a single memory unit to provide access to the information pattern or field which includes such single memory unit. The memory apparatus of the present invention utilizes the address information of a single memory unit to provide access to a selected field or pattern of information. The memory apparatus of the present invention utilizes the address information of a single memory unit to provide access to a field of information. The memory apparatus of the present invention may be utilized to provide storage for three-dimensional information patterns as well as two-dimensional information patterns. The memory apparatus of the present invention utilizes a new and improved arithmetic circuit for providing addresses and a new and improved control circuit for shifting information. The memory apparatus of the present invention functions with efficiency, effectiveness and reliability.

In accordance with the present invention, memory apparatus comprises a plurality of storage units. Each of the storage units comprises a plurality of memory elements. Each of the memory elements has at least a bit of information stored therein. The storage units as a whole have a plurality of addresses. A control circuit for write-in and read-out of information in the storage units includes an arithmetic circuit for selecting one of the addresses of the storage units in a manner whereby a plurality of storage units having the one of the addresses are selected. The plurality of storage units having the one of the addresses are selected simultaneously. Each of the storage units comprises a magnetic core matrix having a plurality of cores each having different windings thereon. The control circuit comprises the arithmetic circuit connected to selected windings of the core matrix and a memory register connected to the arithmetic circuit and to the windings of each of the cores of the core matrix for write-in and read-out of information from selected cores under the control of the arithmetic circuit. The storage units store a pattern of information including a fundamental field having information stored therein and the arithmetic circuit of the control circuit selects the fundamental field by selection of designated information therein thereby selecting the fundamental field in the pattern of information as stored.

In accordance with the present invention, a method of storing and read-out of information, comprises selecting one of a plurality of addresses for a plurality of storage units thereby selecting a plurality of storage units having the one of the addresses. The plurality of storage units are selected simultaneously. Designated information in a fundamental field of a pattern of information stored in the storage units is selected thereby selecting the fundamental field in the pattern of information as stored.

In order that the present invention may be readily carried into effect, it will now be described with reference to the accompanying drawings, wherein:

FIGS. 16, 17 and 18 are schematic illustrations of the shifting operation of the memory apparatus of the present invention;

Figure 1:
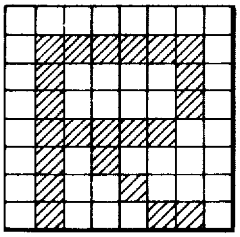
FIG. 1 PRIOR ART
FIG. 1 is a schematic illustration of a known method of storage of an information pattern.
Figure 2:
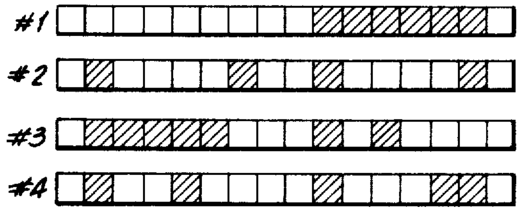
FIG. 2 PRIOR ART
FIG. 2 is a schematic illustration of a known method of storage of an information pattern.

The dimensions of the memory apparatus of the present invention and its operation may be described in comparison with the storage of a pattern, information or information pattern in known memory apparatus. In known memory apparatus, it is necessary to divide the pattern in accordance with the storage units of such memory apparatus in order to store such pattern. Thus, for example, the information pattern may comprise 64 bits, as shown in FIG. 1. A single word comprises 16 bits, so that it is necessary to divide the pattern of FIG. 1 into the four words of FIG. 2. The pattern of FIG. 2 is provided by projecting bits which constitute the pattern of FIG. 1 to memory apparatus in a manner whereby the first line of FIG. 1 is projected on the left half of the first word No. 1 of FIG. 2 and the second line of FIG. 1 is projected on the right half of the first word No. 1. The third line of FIG. 1 is projected on the left half of the second line No. 2 of FIG. 2 and the fourth line of FIG. 1 is projected on the right half of the second line No. 2, and so on.

In storing an information pattern in known memory apparatus of any type, regardless of whether or not it is a fixed or variable word length system, the pattern is projected bit by bit on part of the memory apparatus and is stored. As the information pattern becomes larger, however, the determination of the position in which the pattern is to be stored becomes more and more difficult. The basic difficulty lies in the calculation or determination of the relation between the positions of a pair of arbitrary points in the pattern.

In accordance with the present invention, a corresponding address is provided for each bit or a corresponding address is provided for each group of bits as a unit in the memory apparatus. The memory elements are arranged in matrix form to enable write-in and read-out of information from the memory apparatus. A sufficiently large planar pattern of information may be stored without variation of the relation between the positions of a pair of arbitrary points included in such pattern. The memory apparatus comprises a plurality of single bits and a plurality of groups of memory elements, each group comprising a plurality of bits in two-dimensionel arrangement. Each group of memory elements is provided with a corresponding address and the groups as a whole are provided in planar relationship. The groups of memory elements are hereinafter referred to as storage units; each memory element being a storage unit. A plane of storage units may be provided by arranging said storage units as matrices meeting each other at right angles.

A group of storage units arranged in the form of a planar matrix is hereinafter referred to as an imaginary plane and comprises core matrices of known type. It may be assumed, for the purposes of simplification, that one storage unit stores one bit. However, there is no essential difference if one storage unit stores a plurality of bits. It is assumed that an imaginary two-dimensional matrix includes $m$ times $n$ times $p$ times $q$ units and is a rectangular planar matrix $m$ times $p$ in length and $n$ times $q$ in width. If the imaginary two-dimensional matrix is divided into smaller two-dimensional rectangular matrices, each $m$ in length and $n$ in width, $p$ times $q$ smaller matrices are provided, since the greater matrix comprises $pq$ individual matrices and each individual matrix is of $mn$ dimensions, so that one side of the rectangular greater matrix has the dimension $mp$ and the other side of said greater matrix has the dimension $nq$. Each smaller, two-dimensional, matrix is hereinafter referred to as a screen.

Figure 3:
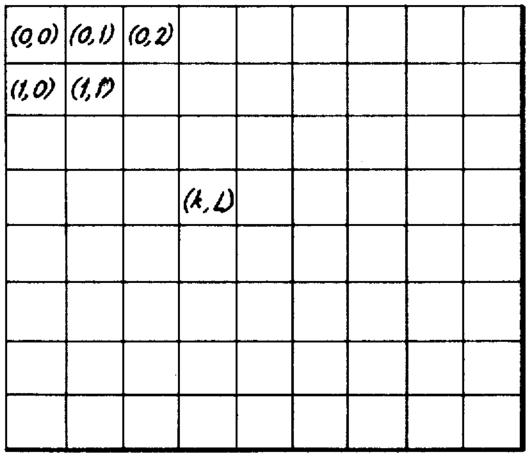
FIG. 3 is a schematic illustration of the method of the present invention.

In FIG. 3, the 0, 0 screen is in the upper left-hand corner and the screens are identified by successively higher numbers as they move from left to right and from top to bottom of the two-dimensional matrix formed by the plurality of screens $mn$. Thus, screen $k$L is the screen which is $k$ from the top and L from the left.

Figure 4:
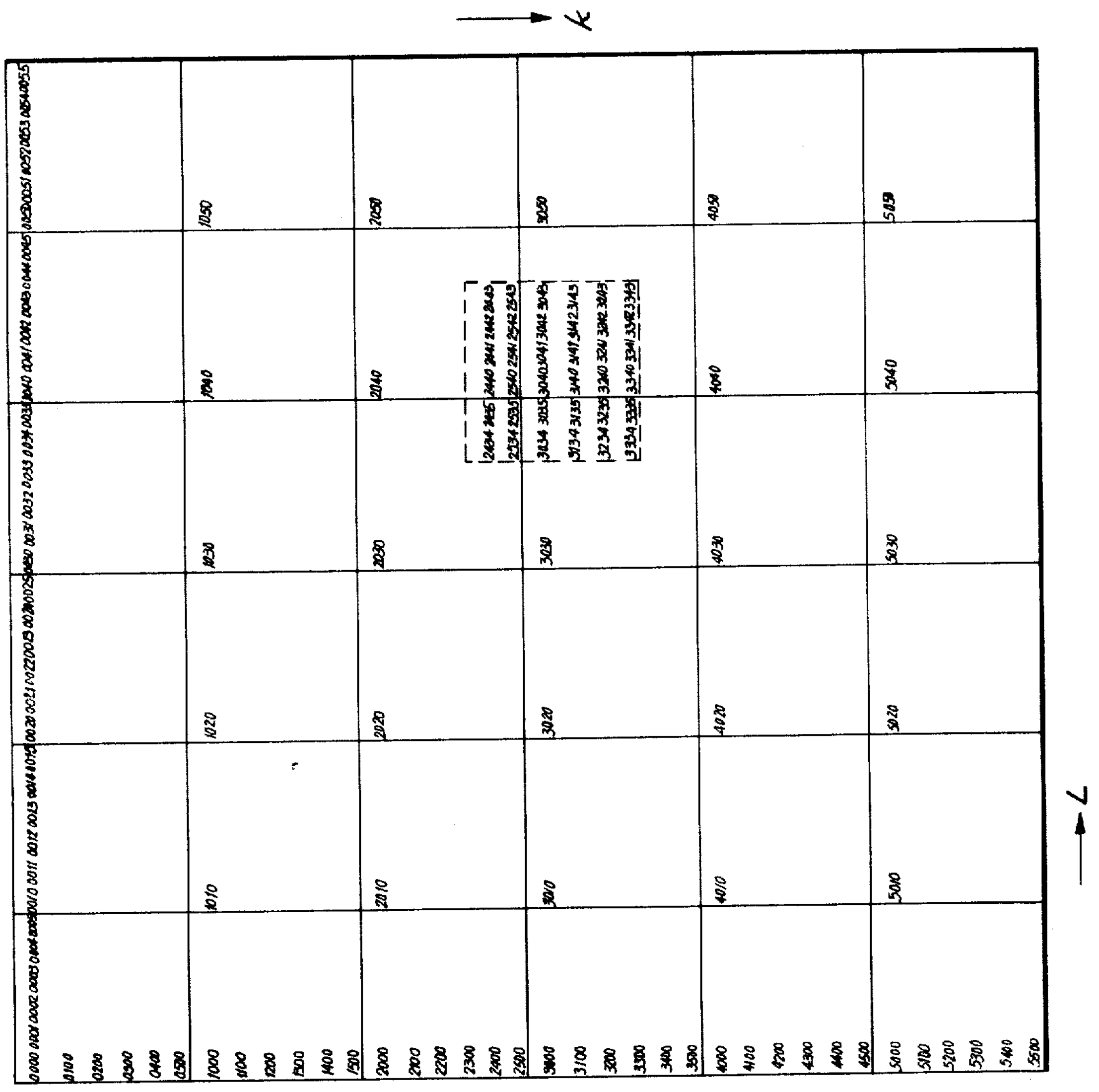
FIG. 4 is a schematic illustration of the method of the present invention.

The storage units of the imaginary plane, as shown in FIG. 4, are identified or labelled in the same manner as described with reference to the screens of FIG. 3. The coordinates of each storage units of the imaginary plane are generally indicated as $f$, $g$. The coordinates of the storage unit which is $i$ from the top and $j$ from the left end of the screen $k$, L is indicated as $$f(k, L, i, j) \text{ and } g(k, L, i, j)$$

and such coordinates may be expressed as $$\left.\begin{array}{l} f(k, L, i, j)=km+i \\ g(k, L, i, j)=Ln+j \end{array}\right\} \quad (1)$$

Figure 6:
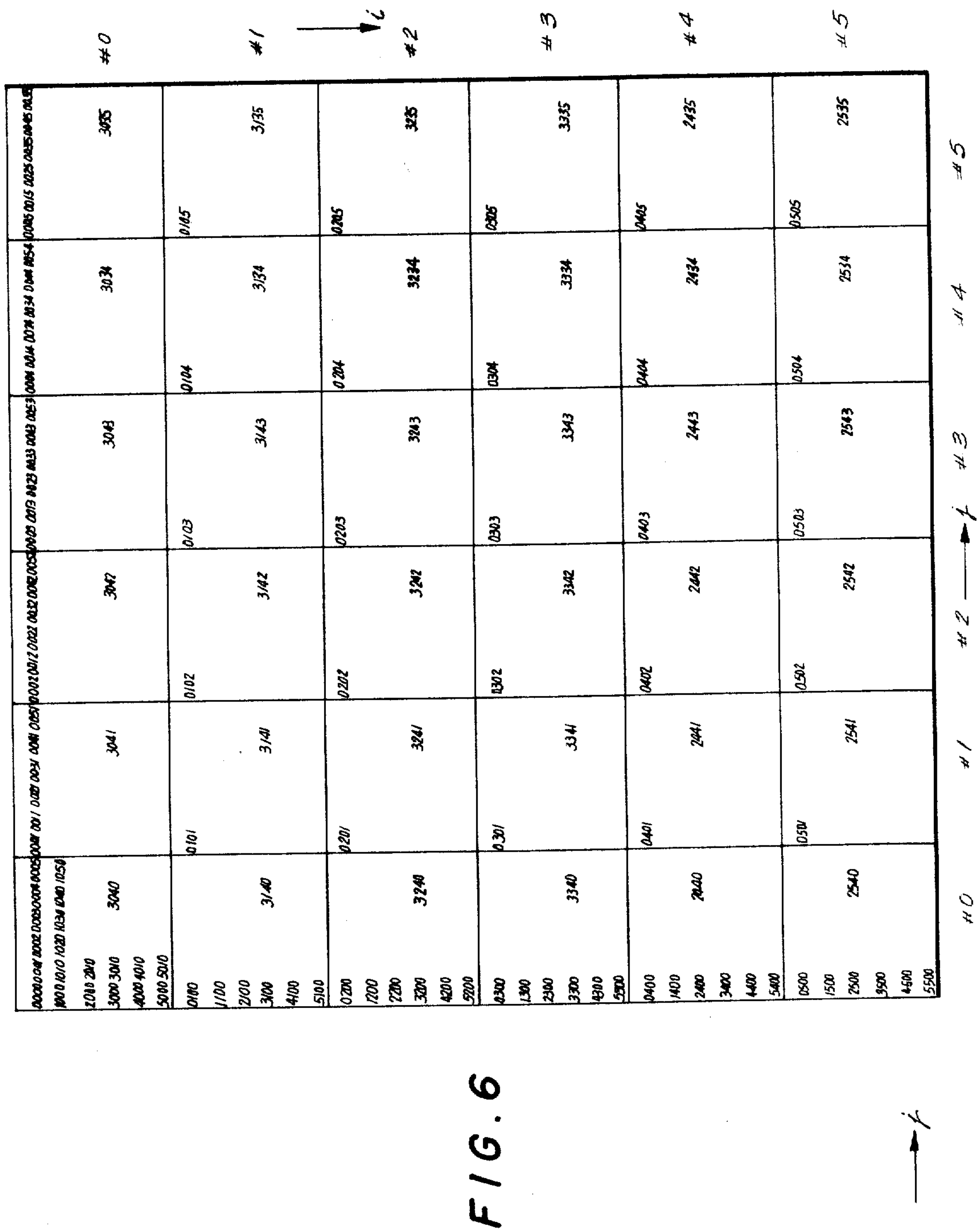
FIG. 6 is a schematic illustration of the method of the present invention.

If only the corresponding $i$, $j$ component elements are selected of all the screens and a new matrix is formed with such elements, and if the element from the $k$, L screen is arranged so that it may become the $i$, $j$ element of the new matrix, the result is that the units of the imaginary plane correspond to the new groups of $m$ times $n$ matrices, unit by unit. The new matrix is hereinafter referred to as the real screen. The real screen, a planar group of which is indicated in FIG. 6, corresponds to the actual memory coordinates of the memory apparatus.

A basic matrix group of the imaginary plane, having the same size and shape as a screen, and with which any screen may be made to coincide by parallel movement, is hereinafter referred to as an eye screen. Wherever the eye screen may be positioned in the imaginary plane, $m$ times $n$ storage units included in such eye screen may be caused to correspond with $m$ times $n$ real screens. Therefore, if $m$ times $n$ core matrices of known type are provided instead of the imaginary plane, and the real screens corresponding to the imaginary plane are made to correspond with such core matrices, it is possible to read-out or write-in the information corresponding to an arbitrary eye screen of the imaginary plane by the utilization of known read-out and write-in apparatus. That is, since one sense system is provided for one real screen, it is possible to provide simultaneous access to all the storage units in the eye screen.

The imaginary plane may comprise a square comprising 36 times 36 units, as shown in FIG. 4. A known register of a type utilizing transistor flip flops and including 6 times 6 elements arranged in a square matrix is utilized as the memory register. A square matrix of 6 times 6 units is utilized as the eye screen. Therefore, core matrices of known type, for example, each comprising 6 times 6 storage units arranged in squares, may be utilized as the real screens. The addresses provided for the storage units are then indicated by a 6 unit system in order to preserve simplicity in circuit design. When the square matrix comprises 10 times 10 storage units, and each unit includes a group of 10 times 10 elements, the addresses are indicated in a decimal system.

Figure 5:
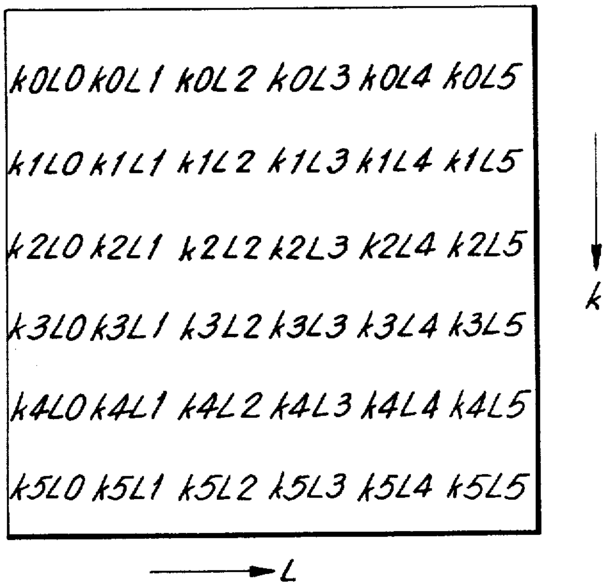
FIG. 5 is a schematic illustration of the method of the present invention.
Figure 7:
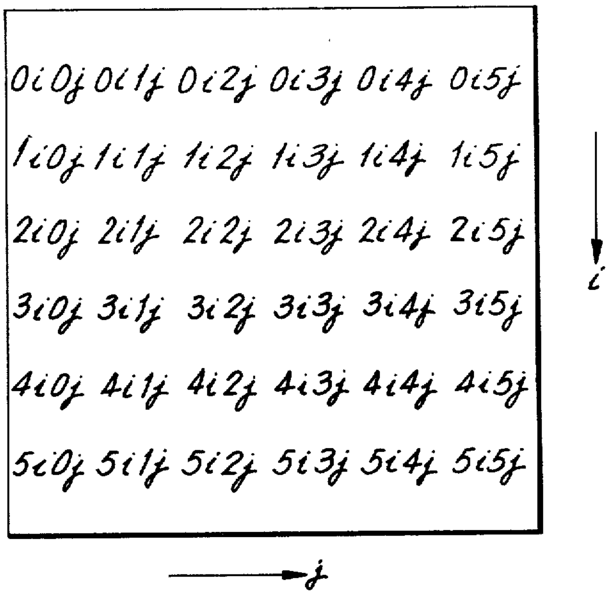
FIG. 7 is a schematic illustration of the method of the present invention.
Figure 8:
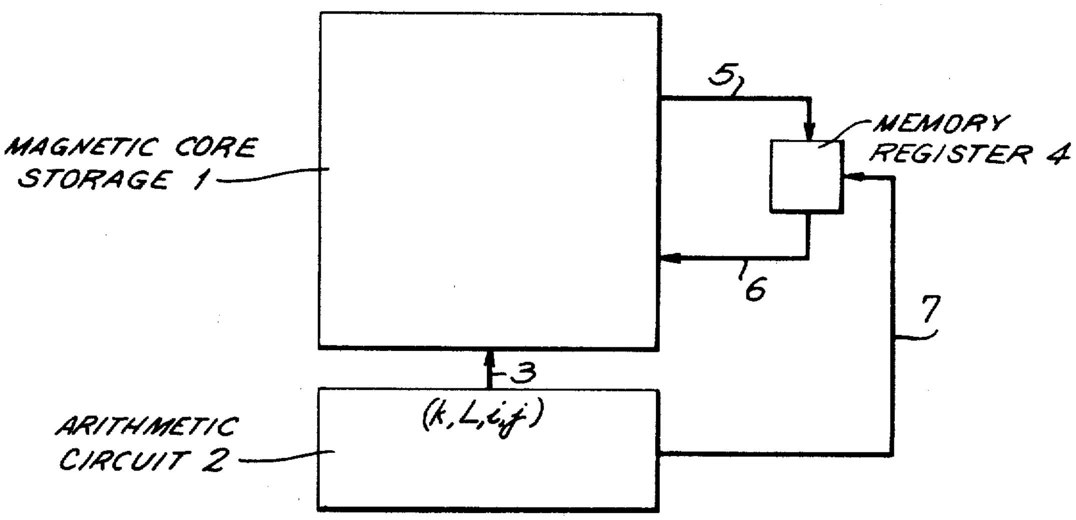
FIG. 8 is a block diagram of an embodiment of the memory apparatus of the present invention.

It is assumed that the position of the eye screen is such that the unit in the upper left-hand corner of said eye screen may become the storage unit having the address 2434 in the imaginary plane. The imaginary plane and the real screens for such an address are shown in FIGS. 4 and 6. FIG. 5 is an elaboration of a single group of FIG. 4 and FIG. 7 is an elaboration of a single real screen of storage units of FIG. 6. The address of the storage unit to be selected from each real screen is provided by the memory apparatus of the present invention as shown in FIG. 8.

The address 2434 is indicated as $kiLj$ and is decoded as $k=2$, $i=4$, $L=3$ and $j=4$. This is due to the fact that $2434=f,g$. Thus, $f=24$ and $g=34$. Since 24, 34 are in a 6 unit system, the address becomes $f=2$ times $6+4$ and $g=3$ times $6+4$ in a decimal system, whereby $f,g=1622$.

Since $m=n=6$, in correspondence with Equation 1, $$k=2,\ i=4,\ L=3,\ j=4$$

Thus, the imaginary storage unit having the address 2434 corresponds to the coordinates 4, 4 of the screen 2, 3. Therefore, in accordance with the definition of a real screen, the corresponding unit of the real memory apparatus has coordinates 2, 3 of screen 4, 4. The units within the eye screen designed by the address 2434 are projected on the real screen in accordance with Equation 2, as follows.

When the numbers of the real screen are $i$, $j$, the coordinates of the storage unit to be selected from the screens $i$, $j$ are $k_i$, $L_j$, and the addresses provided or selected are $k$, L, $i'$, $j'$, $k_i$ and $L_j$ may be expressed as $$k_i=\begin{cases}k & (i'\leqq i)\\ k+1 & (i'\geqq i)\end{cases}$$

$$L_j=\begin{cases}L & (j'\leqq j)\\ L+1 & (j'\geqq j)\end{cases} \qquad (2)$$

The physical meaning of Equation 2 is explained as follows. An example of the selection of a rectangular eye screen, or basic field, is shown by the broken lines in FIG. 4. An eye screen is selected by an address information such as, for example, the coordinates 2434, selected outside the memory and relating to a unit within the eye screen. The unit is a memory element or a one bit memory comprising, for example, a ferrite core. It is therefore necessary to provide access apparatus for permitting all the other addresses, such as coordinates 2435, 3041, 3343, for example, included in the eye screen to be simultaneously selected by only the address information 2434.

The actual memory, or real plane, is shown in FIG. 6, and a storage unit is shown in FIG. 4. The storage unit of FIG. 4 is provided at the coordinates $i$, $j$ of each real screen shown in FIG. 6. Therefore, each storage field, or real screen, has access apparatus, so that if all the access apparatus is operated simultaneously, the storage units of the eye screen in the broken line framework of FIG. 4 may be selected simultaneously.

It may be assumed that the eye screen of the broken line framework of FIG. 4 does not extend over four imaginary screens, having starting addresses of 2030, 3030, 3040 and 2040, as shown in FIG. 4, but is completely included in an imaginary screen $k$, L having a starting address of 2030, for example. The imaginary screen having a starting address of 2030 may then be automatically selected by only one unit address information 2030, selected outside the memory, without the use of Equation 2. In this case, it is only necessary to select coordinates 2, 3 from each real screen $i$, $j$ shown in FIG. 6.

In actuality, however, the eye screen most frequently extends into four imaginary screens, as shown in FIG. 4. In this case, if each real screen is simply selected by the coordinates 2,3, the eye screen of the broken line framework of FIG. 4 cannot be selected. Only the eye screen having the starting address 2030, as hereinbefore described, may then be selected.

Depending upon whether the numbers $i$, $j$ of the real screen are larger or smaller than the values $i'$ and $j'$ of the provided address informations $k_{i'}$, $L_{j'}$, the actual values of $k$ and L selected by the width of each real screen must be changed. That is, in a real screen $i$, $j$, wherein the values of coordinates $i$, $j$ of said screen are larger than the values of the provided coordinates $i'$ and $j'$, the coordinates of $k$, L may be read-out directly. However, in a real screen $i$, $j$, wherein the values of the coordinates $i$, $j$ of said screen are smaller than the values of the provided coordinates $i'$ and $j'$, the coordinates $k+1$, $L+1$ may be read-out.

In a real screen $i$, $j$, wherein the value of $i'$ is large and the value of $j'$ is small, the coordinates $k+1$, L may be read-out. In a real screen $i$, $j$, wherein the value of $i'$ is small and the value of $j'$ is large, the coordinates $k$, $L+1$ may be read-out. This means that $k$ and L of address informations $k$, $i$, L, $j$ having predetermined addresses in all the real screens cannot simply be read-out, but, depending upon the contents of the coordinates $i$, $j$ of the real screen, the values $k+1$ and $L+1$ may be read-out on occasion, rather than the values $k$ and L of the provided information. This is indicated in Equation 2. The circuits shown in FIGS. 8 and 9 are utilized to realize the foregoing.

Figure 9:
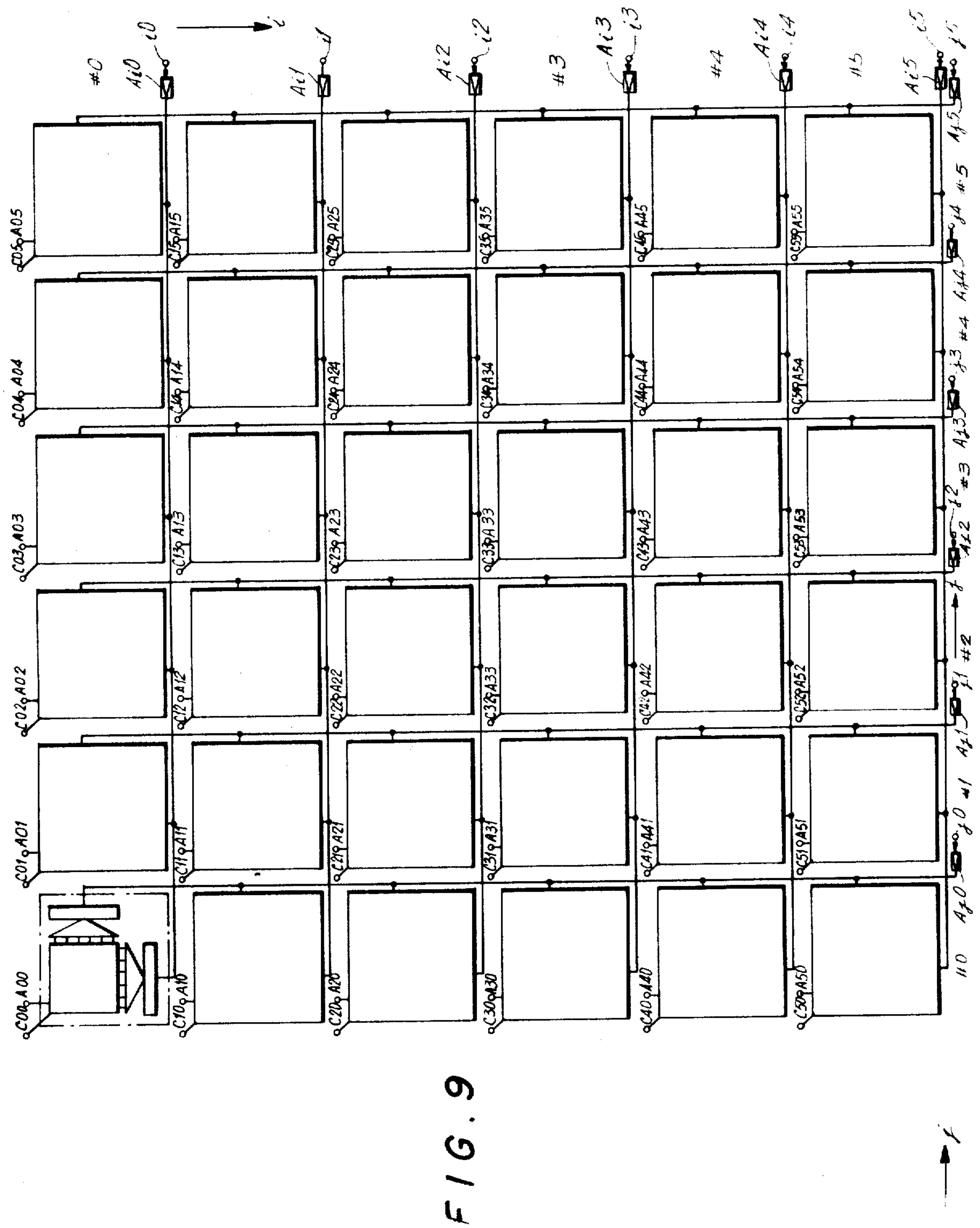
FIG. 9 is a schematic diagram of the core storage of the embodiment of FIG. 8.

The circuit arrangements of FIGS. 8 and 9 illustrate Equation 2. The selected eye screen is read out by the circuits of FIGS. 8 and 9. In FIG. 8, which is the memory apparatus of the present invention, a magnetic core storage 1 functions as the storage part of the memory apparatus and is disclosed in detail in FIG. 9. In the magnetic core storage 1, each real screen has a register for designating the address. The memory units are provided with addresses, as shown in FIG. 7.

In FIG. 8, an arithmetic circuit 2 functions to provide the addresses or address informations. The addresses provided by the arithmetic circuit 2 are supplied to the magnetic core storage 1 via leads 3. The arithmetic circuit 2 is described in detail with reference to FIGS. 11A, 11B and FIGS. 12 and 13, which disclose such arimthetic circuit in detail. The arithmetic circuit 2 calculates the address or address information for each real screen of the core storage 1 based on a single address *k*, L, *i*, *j* provided by a peripheral device. The results of the calculations of the arithmetic circuit 2 are transferred to corresponding registers of the core storage 1 via leads 3, as indicated.

A memory register 4 is a register which functions as a buffer in writing-in to the core storage 1 the information pattern from a peripheral device or reading-out from the core storage 1 the information pattern to the peripheral device, as hereinafter described with reference to FIGS. 14A, 14B. The memory register 4 comprises a plurality of flip flops each corresponding to a real screen of the core storage 1. The read-out of the core storage 1 is undertaken via a lead 5 from said core storage to the memory register 4 and the write-in to said core storage is undertaken via a lead 6 from said memory register. A shift control lead 7, as hereinafter described, extends from the arithmetic circuit 2 to the memory register 4. The shift control lead 7 is connected in the arithmetic circuit 2 to a control circuit, included in said arithmetic circuit, which controls the shifting of the memory register 4, as hereinafter described.

Figure 10:
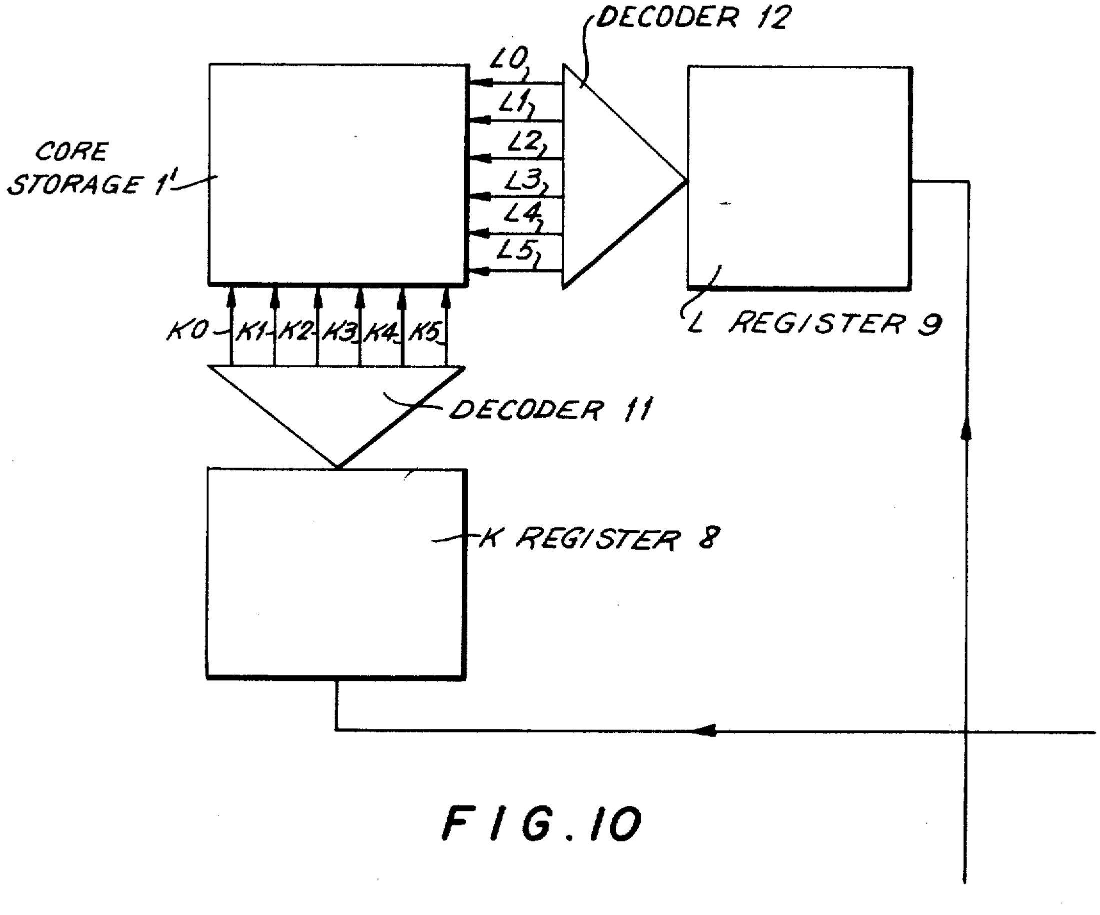
FIG. 10 is a block diagram of a unit of the core storage of FIG. 9.

In FIG. 9, which illustrates the magnetic core storage 1 of FIG. 8 in detail, each square corresponds to one real screen of FIG. 6 and the core storage as a whole is provided with addresses by an arrangement which is that of FIG. 9. Each square of FIG. 9 contains a circuit as illustrated in FIG. 10. The address in the direction of the vertical axis is indicated by *i* and the address in the direction of the horizontal axis is indicated by *j*. The core storage thus comprises *i* times *j* or 6 times 6 real screens.

The circuit shown in the real screen 0 of FIG. 9 is shown on an enlarged scale in FIG. 10. The real screen circuit of FIG. 10 comprises a pair of registers 8 and 9, which designates addresses of the core matrix in the *k* and L directions. The register 8 is a *k* register which designates the address in the *k* direction and the register 9 is an L register which designates the address in the L direction. Each real screen further comprises a decoder 11 and a decoder 12 corresponding to the *k* and L registers 8 and 9, respectively. The decoder 11 is thus connected between the outputs of the *k* register 8 and the corresponding inputs *k*0, *k*1, *k*2, *k*3, *k*4 and *k*5 of the core storage 1′. The decoder 12 is thus connected between the outputs of the L register 9 and the corresponding inputs L0, L1, L2, L3, L4 and L5 of the core storage 1′.

The address information is transferred from output terminals *i*0, *i*1, *i*2, *i*3, i4 and *i*5 (FIG. 9) and *j*0, *j*1, *j*2, *j*3, *j*4 and *j*5 (FIG. 9) to the registers 8 and 9, respectively and is stored therein for designating addresses. The address information is provided by the arithmetic circuit 2 (FIG. 8) and is transferred from the terminals *i*0, *i*1, *i*2, *i*3, *i*4 and *i*5 via amplifiers A*i*0, A*i*1, A*i*2, A*i*3, A*i*4 and A*i*5, respectively. The address information is transferred from the terminals *j*0, j1, *j*2, *j*3, *j*4 and *j*5 via amplifiers A*j*0, A*j*1, A*j*2, A*j*3, A*j*4 and A*j*5, respectively.

The decoders 11 and 12 (FIG. 10) of each real screen function to decode any of the informations *k*, L; $k+1$, L; *k*, $L+1$ and $k+1$, $L+1$ stored in the *k* register 8 and the L register 9 and to select one unit of the core storage 1′. As indicated by Equation 2, the values of the components *i* and *j* determine which of the informations *k*, L; $k+1$, L; *k*, $L+1$; or $k+1$, $L+1$ is transferred to the registers.

The designated address informations are provided in parallel via the *i* leads and the *j* leads in the aforedescribed manner, as indicated in FIG. 9, and all the real screens are read out simultaneously. The read-out of the real screens is undertaken via leads C00 to C55 of FIG. 9. If the core storages or matrices are part of a three-dimensional system having inhibit leads, as well known, the real screens are read out by the sense lines A00 to A55 and are transferred to the memory register 4 of FIG. 8 via the lead 5 of FIG. 8. The output terminals C00 to C55 of FIG. 9 are connected to the corresponding terminals C00 to C55 of FIGS. 14A, 14B. Write-in in a three-dimensional memory system is simultaneously accomplished through the inhibit leads. Inhibit control is provided via the lead 6 of FIG. 8 in accordance with the information of the memory register 4.

The read-out and write-in is accomplished by well known methods, so that they are not described in detail herein. Such methods are described in detail in the following textbooks, for example: "Digital Computing Systems" by Samuel B. Williams, 1959, McGraw-Hill Book Co., pp. 188–189; "Digital Counters and Computers" by Ed Bukstein, 1960, Rinehart & Co., Inc., pp. 180–186; "Fundamentals of Electronic Data Processing," 1962, R.C.A. Institutes, Inc., pp. 155–157.

Figure 11A:
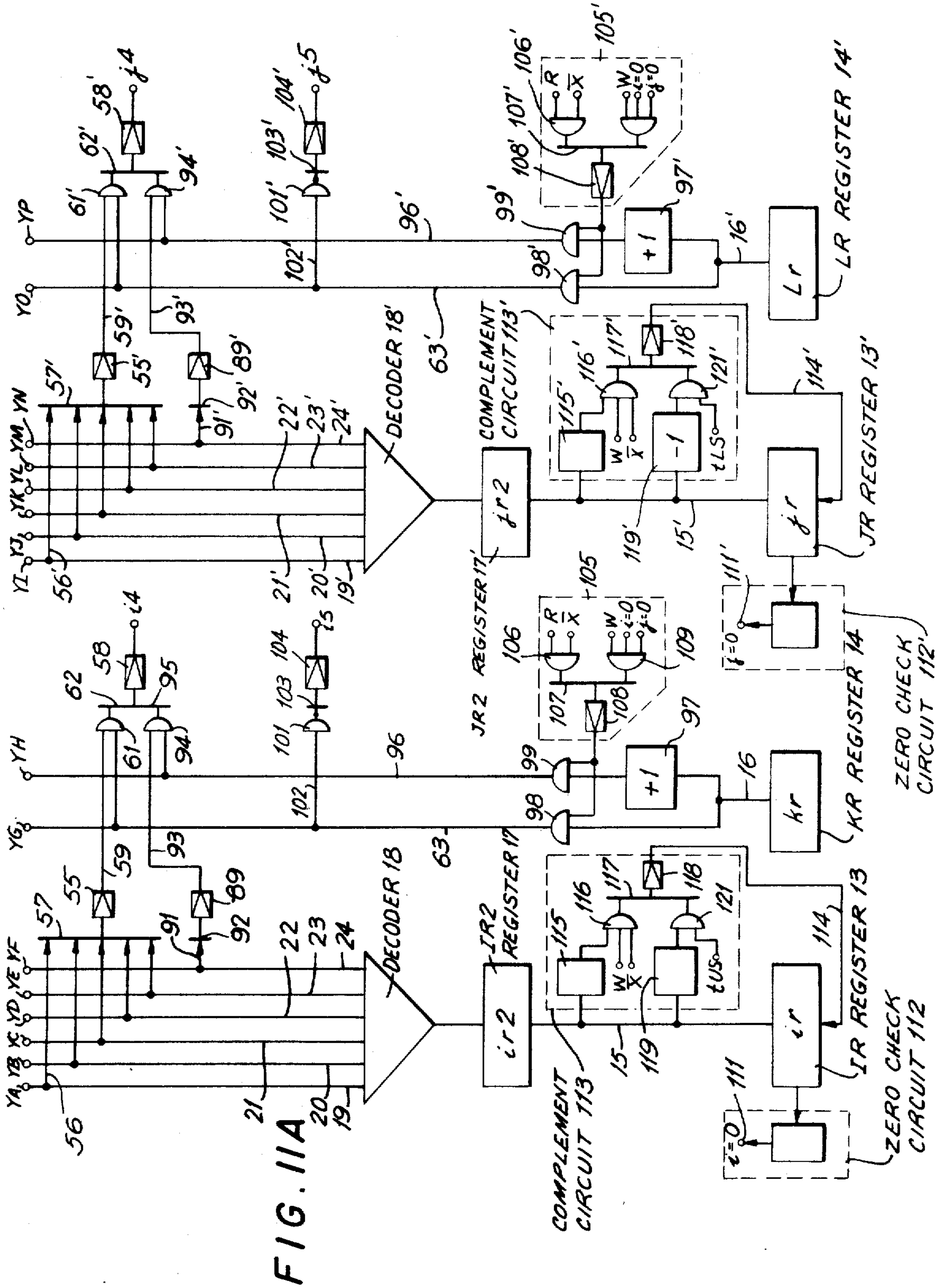
FIGS. 11A and 11B are a circuit diagram of an embodiment of the arithmetic circuit and the control circuit of the embodiment of FIG. 8.
Figure 11B:
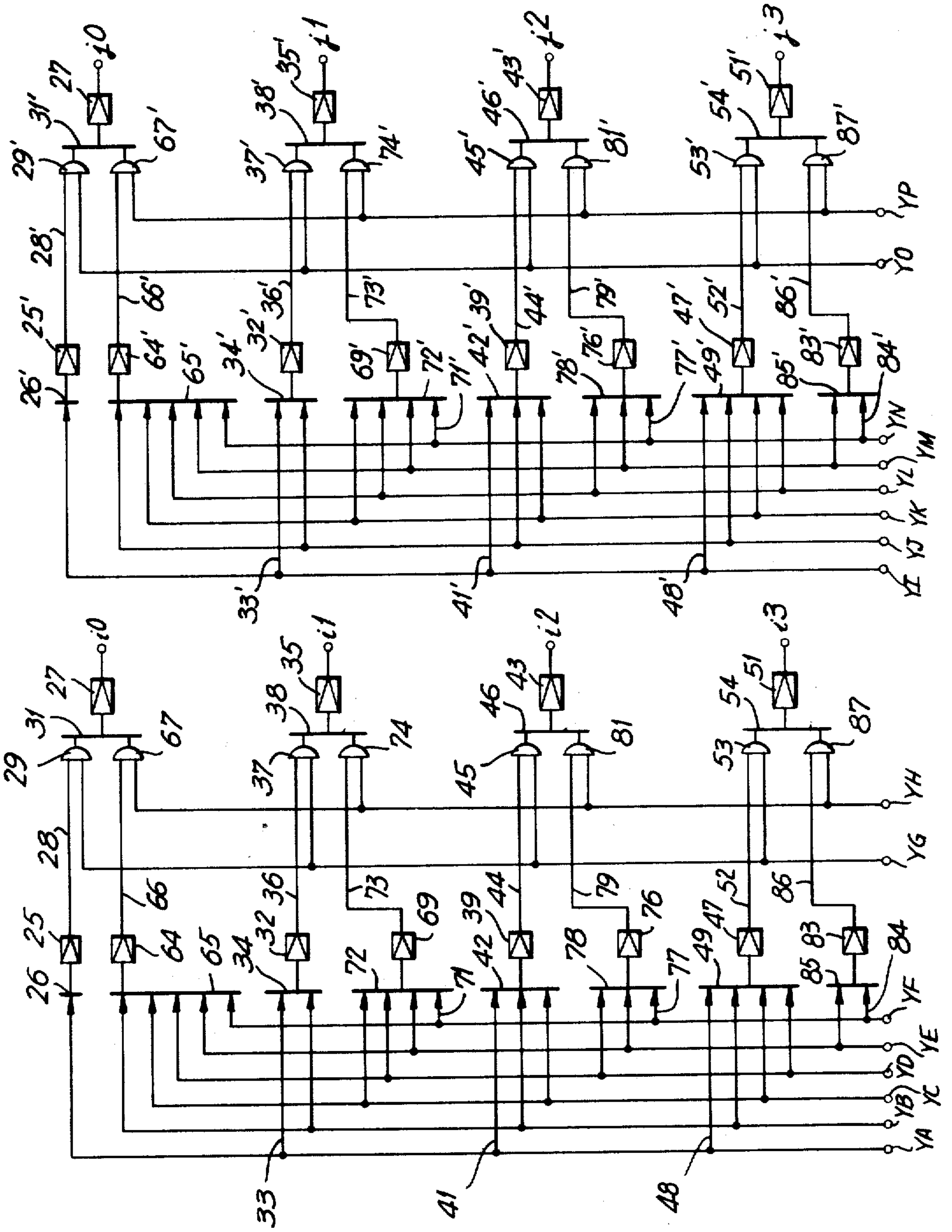

The arithmetic device of FIGS. 11A, 11B determines the address of the real screen from the information of a single address provided by a peripheral device such as a computer. All the eye screens are determined by a single address providing the address of a real screen. A peripheral device or peripheral devices (not shown in the drawings) function to store digits *i*, *k*, *j* and L in an *ir* register 13, a *kr* register 14, a *jr* register 13′ and an L*r* register 14′, respectively. The stored digits *i*, *k*, *j* and L are transferred to the circuits of the next succeeding stage via leads 15, 16, 15′ and 16′, respectively, under the control of clock pulses. The digit *i* is thus stored in an *ir*2 register 17 and the digit *j* is stored in a *jr*2 register 17′, via leads 15 and 15′, respectively. The digit *i* which is stored in the register 17 is supplied to a decoder 18 and selects one of the output leads 19 to 24 of said decoder. When the digit *i* has a value of zero, the output lead 19 is selected, when the digit *i* has a value of 1, the output lead 20 is selected, when the digit *i* has a value of 2, the output lead 21 is selected, when the digit *i* has a value of 3, the output lead 22 is selected, when the digit *i* has a value of 4, the output lead 23 is selected and when the digit *i* has a value of 5, the output lead 24 is selected. The digit *j*, which is in the register 17′, is supplied to a decoder 18′ wherein it selects one of the output leads 19′ to 24′ of said decoder in a manner similar to that of the selection of output leads of the decoder 18 by the digit *i*.

Table I is a tabular presentation of the numerical values of *i* and the leads corresponding thereto and Table II is a tabular presentation of the numerical values of *j* and the leads corresponding thereto.

TABLE I

| *i*: | Lead |
|---|---|
| 0 | **19** |
| 1 | **20** |
| 2 | **21** |
| 3 | **22** |
| 4 | **23** |
| 5 | **24** |

TABLE II

| *j*: | |
|---|---|
| 0 | **19′** |
| 1 | **20′** |
| 2 | **21′** |
| 3 | **22′** |
| 4 | **23′** |
| 5 | **24′** |

When the lead 19 is selected, for example, current flows to an amplifier 25 via an OR-gate 26 and from said amplifier to an amplifier 27 via a lead 28, and an AND-gate 29 and an OR-gate 31. The current also flows to an amplifier 32 via a lead 33 and an OR-gate 34 and from said amplifier to an amplifier 35 via a lead 36, an AND-gate 37 and an OR-gate 38. Current flows to an amplifier 39 via a lead 41 and an OR-gate 42 and from said amplifier to an amplifier 43 via a lead 44, an AND-gate 45 and an OR-gate 46. Current flows to an amplifier 47 via a lead 48 and an OR-gate 49 and from said amplifier to an amplifier 51 via a lead 52, an AND-gate 53 and an OR-gate 54.

Current flows to an amplifier 55 via a lead 56 and an OR-gate 57 and from said amplifier to an amplifier 58 via a lead 59, an AND-gate 61 and an OR-gate 62. Each of the AND-gates 29, 37, 45, 53 and 61 is thus in a condition in which it may be made conductive by a signal or current in a lead 63. When the lead 24' is selected, for example, current flows to an amplifier 64' via an OR-gate 65' and from said amplifier to the amplifier 27' via a lead 66', an AND-gate 67' and the OR-gate 31'. Current flows to an amplifier 69' via a lead 71' and an OR-gate 72' and from said amplifier to the amplifier 35' via a lead 73', an AND-gate 74' and the OR-gate 38'. Current flows to an amplifier 76' via a lead 77' and an OR-gate 78' and from said amplifier to the amplifier 43' via a lead 79', an AND-gate 81' and the OR-gate 46'. Current flows to an amplifier 83' via a lead 84' and an OR-gate 85' and from said amplifier to the amplifier 51' via a lead 86', an AND-gate 87' and the OR-gate 54'. Current flows to an amplifier 89' via a lead 91' and an OR-gate 92' and from said amplifier to the amplifier 58' via a lead 93', an AND-gate 94' and the OR-gate 62'. Each of the AND-gates 67', 74', 81', 87' and 94' is thus in a condition in which it may be made conductive by a signal or current in a lead 96'.

The right-hand portion of FIGS. 11A, 11B processes the digits *j* and L and functions in the same manner as the left-hand portion of said figures; said left-hand portion processing the digits *i* and *k*. Thus, only the operation of the left-hand portion is described hereinafter, it being understood that the operation of the right-hand portion is similar, with the reference numerals of the right-hand portion being the same as those of the left-hand portion, except primed. In FIGS. 11A, 11B, exceptionally thick lines, such as 15, 16, 63 and 96, indicate a plurality of leads rather than a single lead, as indicated by the thinner lines. In other words, the thicker lines are the paths of the transfer of a plurality of bits in parallel.

The digit *k* is provided to the *kr* register 14. The register 14 transfers the digit *k* via the lead 16 to the lead 63 without modification. During the transfer of the digit *k* to the lead 96, however, said digit passes through a circuit 97 which adds the digit 1 to it. Thus, the signal arriving in the lead 96 from the register 14 is $k+1$, rather than *k*, which arrives in the lead 63. The digit *k* in the lead 63 passes through an AND-gate 98 and the digit $k+1$ in the lead 96 passes through an AND-gate 99. Thus, the digit *k* is supplied to each of the output terminals *i*0, *i*1, *i*2, *i*3, *i*4 and *i*5 via the corresponding AND-gates 29, 37, 45, 53, 61 and 101. The digit *k* reaches the output terminal *i*5 via a lead 102, the AND-gate 101, an OR-gate 103 and an amplifier 104. The digit $k+1$ is provided at the output terminals *i*0, *i*1, *i*2, *i*3 and *i*4 via the AND-gates 67, 74, 81, 87 and 94.

When the output lead 19 from the decoder 18 is selected, the digit *k* is supplied to all the terminals *i*0 to *i*5. When the output lead 24 of the decoder 18 is selected, however, the digit $k+1$ is supplied to all the terminals *i*0 to *i*4. This is due to the control of the aforementioned AND-gates by the output signals of the decoder 18. Thus, only the digit *k* is provided at the terminal *i*5. As hereinbefore mentioned, the terminals *i*0 to *i*5 of FIGS. 11A, 11B correspond to the terminals *i*0 to *i*5 of FIG. 9. In the aforedescribed manner, the digit L is supplied to each of the terminals *j*0 to *j*5 and the digit $L+1$ is supplied to each of the terminals *j*0 to *j*4.

The AND-gates 98 and 99 and a circuit 105 connected thereto are utilized to provide shift control, as hereinafter described with reference to FIGS. 12 and 13. The circuit 105 comprises an input terminal R and an input terminal X leading into an AND-gate 106. The AND-gate has an output connected to a OR-gate 107 and the output of the OR-gate is connected to the inputs of the AND-gates 98 and 99 via an amplifier 108. A plurality of input terminals W, $i=0$ and $j=0$ are connected to an AND-gate 109. The output of the AND-gate 109 is connected to the OR-gate 107.

The actual process of selection of the field is indicated by broken lines in FIG. 4 by the address information, which is 2434 in the present example, and utilized in the foregoing description of the imaginary plane, and is further described as follows. The digits are $k=2$, $i=4$, $L=3$ and $j=4$. Therefore, the digits 4, 2, 4 and 3 are stored in the *ir* register 13, the *kr* register 14, the *jr* register 13' and the L*r* register 14', respectively, of FIGS. 11A, 11B. These digits are supplied to said registers by peripheral devices not shown in the drawings. The digit 4 which is stored in the register 13, is further stored in the *ir*2 register 17 and the lead 23, which corresponds to 4, is selected by the decoder 18. Similarly, the digit 4 which is stored in the *jr* register 13', is further stored in the *jr*2 register 17' and the lead 23, which corresponds to the digit 4, is selected by the decoder 18'. The leads from the decoder 18 and from the decoder 18' are indicated in FIGS. 11A, 11B and the contents of *i*, *j* determine whether the digit *k* or the digit $k+1$ is provided for each real screen.

In the selected embodiment of the invention, $k+1$, or 3, is provided at the output terminals *i*2 and *i*3; *k*, or 2, is provided at the output terminals *i*4 and *i*5. $L+1$, or 4, is provided at the output terminals *j*0, *j*1, *j*2 and *j*3, and L, or 3, is provided at the output terminals *j*4 and *j*5. The leads L0 to L5 and *k*0 to *k*5 of FIGS. 9 and 10, are connected to the corresponding leads 19' to 24' and 19 to 24 of FIGS. 11A, 11B. Thus, *k* or $k+1$, or L or $L+1$, provided by the circuit of FIGS. 11A, 11B is supplied to the *k* register 8 and the L register 9 of each of the real screens (FIGS. 9 and 10). Therefore, the field shown by broken lines in the imaginary plane of FIG. 4 is read out in its entirety simultaneously.

Figure 14A:
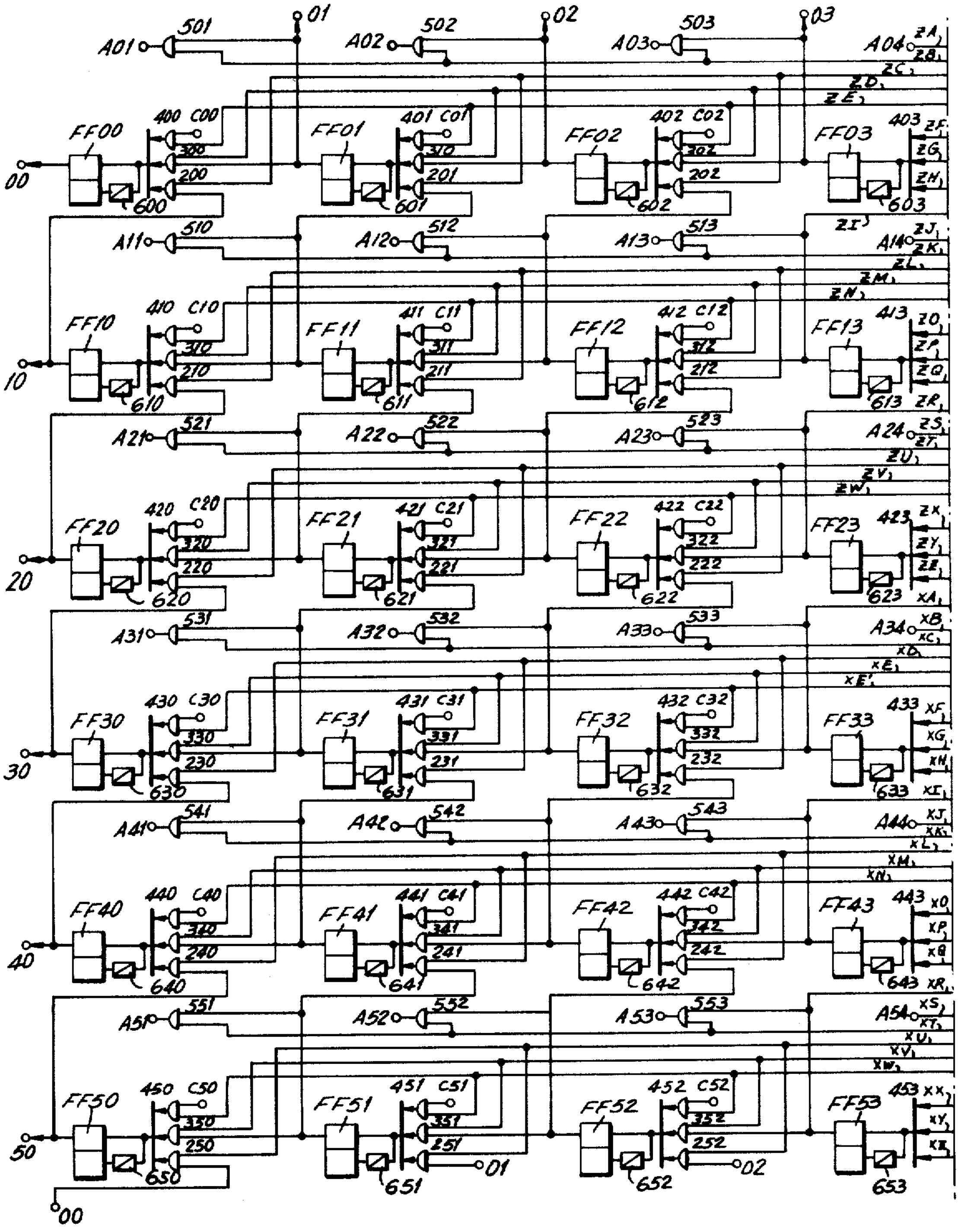
FIGS. 14A and 14B are a circuit diagram of the memory register of the embodiment of FIG. 8.
Figure 14B:
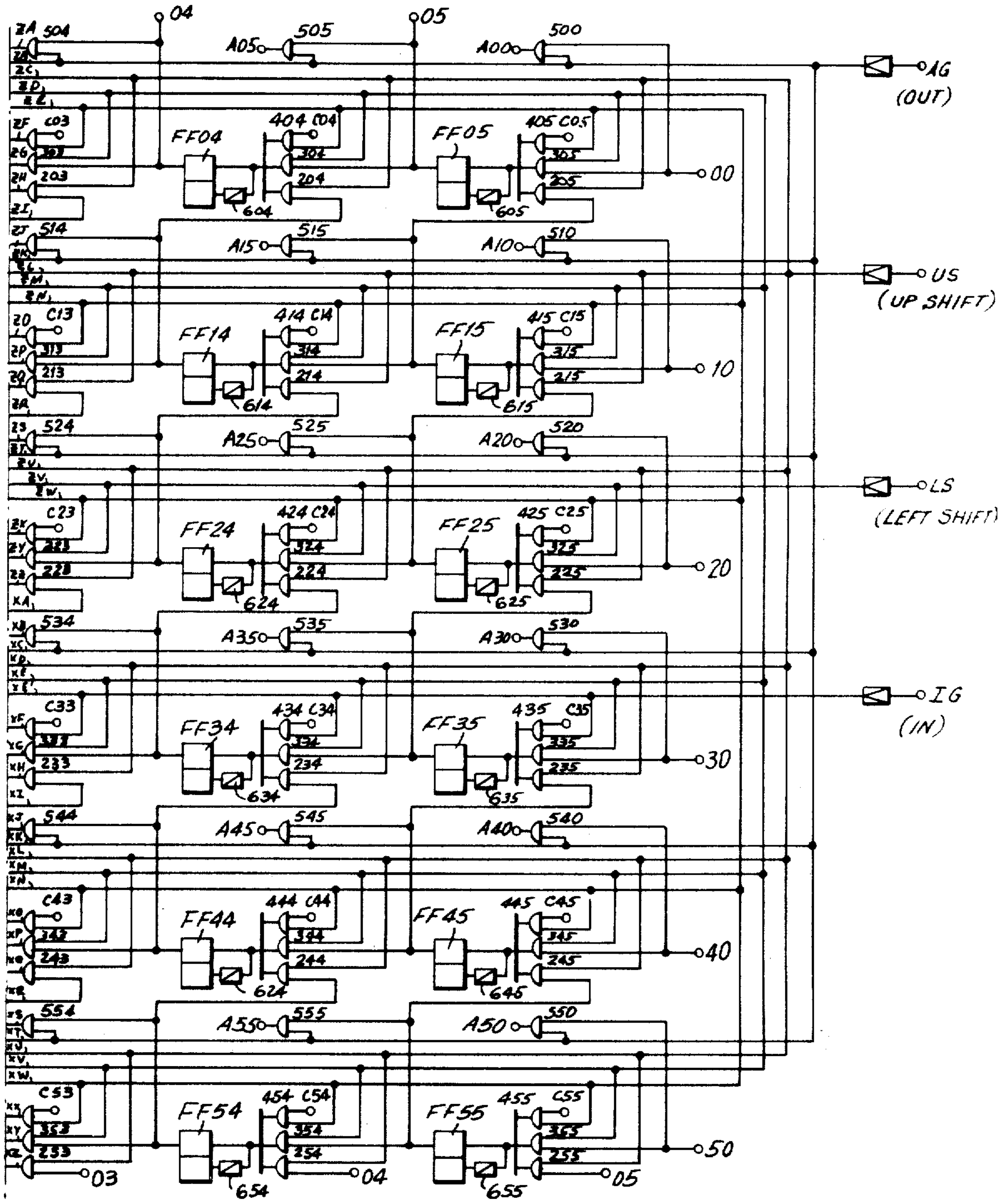

The memory register 4 of the embodiment of FIG. 8 of the memory apparatus of the present invention is illustrated in FIGS. 14A, 14B. The memory register comprises 6 times 6 flip flops FF00 to FF05, FF10 to FF15, FF20 to FF25, FF30 to FF35, FF40 to FF45, and FF50 to FF55. All the eye screens may be read out and registered in the flip flops of FIGS. 14A, 14B, and also, all the digits which are written into the memory device from said flip flops may be registered. The flip flops are connected in a manner whereby each flip flop is associated with a corresponding one of the real screens, so that the read out digit itself does not form the information pattern of the eye screen. Furthermore, it is impossible to store the information pattern registered in the memory register in an arbitrary field or eye screen of the imaginary screen without modification. This process is described with reference to FIGS. 16, 17 and 18.

FIG. 16 illustrates how the address of the eye screen read out or written in by the address information 2434 shown in FIG. 4 corresponds to a memory register. FIG. 17 illustrates the information pattern available by reading out the alphabetic character R which is stored in the eye screen. The normal alphabetic character R is not available before the memory register is shifted up by *i* columns, that is, four columns, and is shifted to the left by *j* columns, that is four columns. It is thus impossible to determine whether the read out information pattern represents the alphabetic character R or not, prior to the shifting of said information pattern. That is, the information pattern which includes the address information of the group of real screens itself, that is, $k+1$, 0, $L+1$, 0, is provided in the upper left-hand corner, so that the information pattern on the left-hand side of FIG. 17, which is the right-hand position, is derived from the core storage or core matrix 1 (FIG. 8) as the real screen. It is therefore necessary to process the information in order to change it into the normal pattern. This is accomplished by the shifting operation. The right-hand side of FIG. 17 is the left-hand position.

FIG. 18 discloses the shifting operation for write-in of information. The right-hand side of FIG. 18 is the left-hand position and the left-hand side of FIG. 18 is the right-hand position. In the present disclosure, the complement of a digit is the difference between such digit and 6. When information is written in, the complement of *i*, which is $6-i$, and the complement of *j*, which is $6-j$, are calculated, and the shifting operation upward and to the left is performed in accordance with such complements. The memory register of FIGS. 14A, 14B performs the aforedescribed shifting operation. The memory register is shifted upward by making conductive a plurality of AND-gates 200 to 205, 210 to 215, 220 to 225, 230 to 235, 240 to 245 and 250 to 255. Each of the foregoing AND-gates is connected to a corresponding one of the flip flops FF00 to FF05, and so on to FF55. The AND-gates 200 to 205, and so on to 255, are switched to their conductive condition by signals in an input terminal US.

The memory register is shifted to the left by opening a plurality of AND-gates 300 to 305, 310 to 315, 320 to 325, 330 to 335, 340 to 345 and 350 to 355, each connected to a corresponding one of the flip flops FF00 to FF05, and so on to FF55. The AND-gates 300 to 305, and so on to 355, are switched to their conductive condition by signals in an input terminal LS. As in known shift registers, the aforedescribed operation is performed synchronously under the control of a clock pulse.

In FIGS. 14A, 14B, each of the terminals designated with an asterisk is connected to another of such terminals having the same reference numerals. Thus, the three output terminals 00 are connected to each other, the two output terminals 01 are connected to each other, the two output terminals 02 are connected to each other, the two output terminals 03 are connected to each other, the two output terminals 04 are connected to each other, the two output terminals 05 are connected to each other, the two output terminals 10 are connected to each other, the two output terminals 20 are connected to each other, the two output terminals 30 are connected to each other, the two output terminals 40 are connected to each other and the two output terminals 50 are connected to each other. These connections provide cyclical connection of the memory register in the *i* direction and *j* direction through the adjacent columns. The input signals are supplied to the memory register of FIGS. 14A, 14B via a plurality of terminals C00 to C05, C10 to C15, C20 to C25, and so on to C55. The terminals C00 to C05, and so on to C55, are the same as the lead 5 from the core storage 1 to the memory register 4 of FIG. 8. That is, the terminals C00 to C05, and so on to C55 of FIG. 9 are connected to the corresponding terminals C00 to C05, and so on to C55 of FIGS. 14A, 14B. The input signals supplied via the terminals C00 to C05, and so on to C55, function to set the corresponding flip flops FF00 to FF05, and so on to FF55, via the corresponding ones of a plurality of AND-gates 400 to 405, 410 to 415, 420 to 425, 430 to 435, 440 to 445 and 450 to 455. When the input signal is zero, the corresponding flip-flop remains in its reset condition. The set and reset operations are performed synchronously with signals supplied via an input terminal IG.

The read-out of information from the memory register of FIGS. 14A, 14B is accomplished via a plurality of AND-gates 501 to 505, 500, 511 to 515, 510, 521 to 525, 520, 531 to 535, 530, 541 to 545, 540, 551 to 555 and 550. Each of the AND-gates 501 to 505, 500, and so on to 555, is connected to the output of a corresponding one of the flip flops FF00 to FF05, and so on to FF55, and each of said AND-gates transfers a signal to a corresponding one of a plurality of outputs A01 to A05, A00, A11 to A15, A10, A21 to A25, A20, A31 to A35, A30, A41, A40 to A45, A51 to A55 and A50, synchronously with a signal provided at a terminal AG. The signals transferred via the output terminals A01 to A05, A00, and so on to A55, are utilized to determine whether the write-in circuit, that is, the inhibit wire or lead of the core storage or matrix 1, should be energized or not. These signals may also be transferred to the registers of peripheral devices (not shown in the drawings) which may comprise, for example, cathode ray tube display devices. The signals from such peripheral devices are transferred to the memory register of FIGS. 14A, 14B via the terminals C00 to C05, and so on to C55.

In FIGS. 14A, 14B, a corresponding one of a plurality of inverters 600 to 605, 610 to 615, 620 to 625, 630 to 635, 640 to 645 and 650 to 655 is connected to the reset input of each of the flip flops FF00 to FF05, and so on to FF55. Each of the inverters 600 to 605, and so on to 655, comprises a known circuit.

In FIGS. 11A, 11B, the address information is transferred to the registers of the magnetic core storage 1 (FIG. 8) only when the AND-gates 106 and 109 are switched to their conductive condition theerby switching the AND-gates 98 and 99 to their conductive condition. The AND-gate 106 is switched to its conductive condition only when there is a signal in each of the input terminals $\overline{R}$ and $\overline{X}$ A signal is provided at the input terminal R when the flip flop 801 of FIG. 12 is in its set condition and when the flip flop 803 of FIG. 12 is in its reset condition. The AND-gate 109 is switched to its conductive condition when an input signal is provided at each of its input terminals W, $i=0$ and $j=0$. A signal is provided to the input terminal W when the flip flop 802 of FIG. 12 is in set condition, and signals are provided to the input terminals $i=0$ and $j=0$ when the contents of the *ir* register 13 are zero so that there is a signal at a terminal 111, and the contents of the *jr* register 13' are zero so that there is a signal at a terminal 111'. In FIGS. 11A, 11B, a zero check circuit 112 connected between the *ir* register 13 and the terminal 111 determines whether or not the contents of said register are zero. The contents of the *jr* register 13' are checked by a zero check circuit 112' connected between said register and the terminal 111'. The zero check circuit 112 provides a signal when it determines that the contents of the register 13 are zero. The zero check circuit may comprise any suitable zero check circuit known.

In FIGS. 11A, 11B, a complement circuit 113 is connected between the lead 15 from the *ir* register 13 to an input of said register via a lead 114. A complement circuit 113' is connected between the lead 15' from the *jr* register 13' to an input of said register via a lead 114'. The complement circuit 113, and the similar complement circuit 113', which is therefore not separately described, comprises a complement unit 115 connected to the lead 15 which provides the complement of the signal with 6, so that the complement unit provides the complements of the contents of the *ir* register 13 and supplies such complements back to said register. The output of the complement unit 115 is thus conected to the lead 114 via an AND-gate 116, an OR-gate 117 and an amplifier 118. The AND-gate 116 has input terminals W and $\overline{X}$, so that the contents of the register 13 are not provided unless a signal W from the flip flop 802 of FIG. 12 is supplied to the input terminal W and a signal $\overline{X}$ from the flip flop 803 in its reset condition (FIG. 12) is supplied to the input terminal $\overline{X}$.

The complement circuit 113 further comprises an arithmetic circuit 119 which is connected to the lead 15 and which provides a digit $i-1$. The output of the arithmetic circuit 119 is connected to the lead 114 via an AND-gate 121, the OR-gate 117 and the amplifier 118. The AND-gate 121 has an input terminal *t*US and the AND-gate 121' has an input terminal *t*LS. Thus, when a signal is provided to the terminal *t*US by the circuit of FIG. 13, the arithmetic circuit 119 subtracts 1 from *i* and the difference is supplied back to the register 13 via the AND-gate 121, the OR-gate 117, the amplifier 118 and the lead 114. When a signal is provided to the terminal *t*LS by the circuit of FIG. 13, the arithmetic circuit 119' subtracts 1 from *j* and the difference is supplied back to the register 13' via the AND-gate 121', the OR-gate 117', the amplifier 118' and the lead 114'. The difference provided by the arithmetic circuit 119 and the difference provided by the arithmetic circuit 119' are included in the zero check made by the zero check circuits 112 and 112', respectively.

Figure 12:
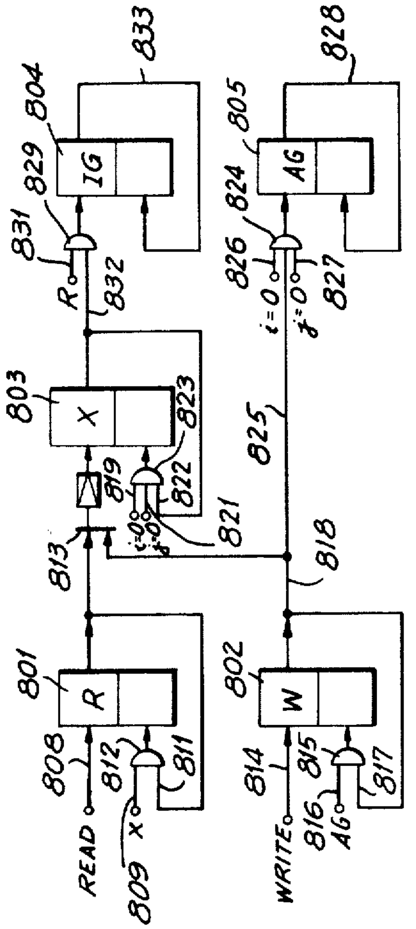
FIG. 12 is a circuit diagram of part of the embodiment of FIGS. 11A and 11B.

The circuit of FIG. 12 thus provides the signals R, W and X, as well as the signals IG and AG (FIGS. 14A, 14B and 11A, 11B). The circuit of FIG. 13 provides the signals *t*US and *t*LS (FIGS. 11A, 11B). In each of FIGS. 12 and 13, each flip flop comprises a known type of flip flop which is in its reset or OFF condition initially. The circuit of FIG. 12 comprises flip flops 801, 802, 803 804 and 805. The flip flop 804 provides the signal IG and the flip flop 805 provides the signal AG. FIG. 13 comprises flip flops 806 and 807; the flip flop 806 provides the signal LS and the flip flop 807 provides the signal US.

The flip flop 801 provides the signal R when it is switched to its set condition by a read signal supplied to a lead 808 which is connected to its set input. The flip flop 801 is switched to its reset condition immediately after the flop flop 803 in the next succeeding stage is switched to its set condition. That is, when the flip flop 803 is set, a lead 809 provides a 1 signal and a lead 811 transfers a 1 signal which is the set signal of the flip flop 801. An AND-gate 812 having an input connected to a terminal which is supplied with the signal X from the flip flop 803 and an input connected to the lead 111, with an output connected to the reset input of the flip flop 801, is thus switched to its conductive condition. The signal X is provided by the flip flop 803 when either of the flip flops 801 or 802 is in its set condition.

An OR-gate 813 is connected between the set outputs of the flip flops 801 and 802 and the set input of the flip flop 803 in order to permit the switching of the flip flop 803 to its set condition when either of the flip flops 801 or 802 is in its set condition. The flip flop 802 provides the signal W and is switched to its set condition when a write signal is provided via a lead 814. An AND-gate 815 has an input connected to a terminal which supplies the signal AG via a lead 816 and an input connected to the set output of the flip flop 802 via a lead 817. The AND-gate 815 has an output connected to the reset input of the flip flop 802. When the AND-gate 815 is switched to its conductive condition, the flip flop 802 is thus reset. The AND-gate 815 is switched to its conductive condition when the flip flop 805 in the next succeeding stage is in its set condition, thereby transferring a 1 signal via the lead 816 to the flip flop 802.

When the flip flop 802 is in its set condition, the flip flop 803 and 805 are switched to their set conditions via a lead 818. After the flip flop 803 is switched to its set condition by the signal R or W, in the aforedescribed manner, it is maintained in its set condition until the digit *i* of the *ir* register 13 becomes zero and the digit *j* of the *jr* register 13' becomes zero (FIGS. 11A, 11B). When each of the digits *i* and *j* is zero, leads 819, 821 and 822 of an AND-gate 823 each transfers a 1 signal to such AND-gate. The AND-gate 823 is thus switched to its conductive condition. Since the output of the AND-gate 823 is connected to the reset input of the flip flop 803 of FIG. 12, said flip flop is switched to its reset condition.

The flip flop 805 of FIG. 12 provides the signal AG and is switched to its set condition when an AND-gate 824 is in its conductive condition. The AND-gate 824 has an input lead 825 connected to the set output of the flip flop 802, an input lead 826 to which the digit $i=0$ is supplied, and an input lead 827 to which the digit $j=0$ is supplied. The output of the AND-gate 824 is connected to the set input of the flip flop 805. The AND-gate 824 is switched to its conductive condition when the flip flop 802 is in its set condition and when each of the digits *i* and *j* is zero. The flip flop 805 transmits a signal AG which causes the memory register of FIGS. 14A, 14B to produce an output signal. The flip flop 805 is reset by a signal in a lead 828 which is connected from its set output to its reset input after it has produced the signal AG.

The flip flop 804 is switched to its set condition when an AND-gate 829 is switched to its conductive condition. The AND-gate 829 has an input lead 831 to which the signal R is supplied and an input lead 832 which is connected to the set output of the flip flop 803. The output of the AND-gate 829 is connected to the set input of the flip flop 804. The AND-gate 829 is switched to its conductive condition when the flip flops 801 and 803 are set, via the lead 832. The flip flop 804 is switched to its reset condition by a signal in a lead 833 which is connected from its set output to its reset input after it has produced the signal IG.

Figure 13:
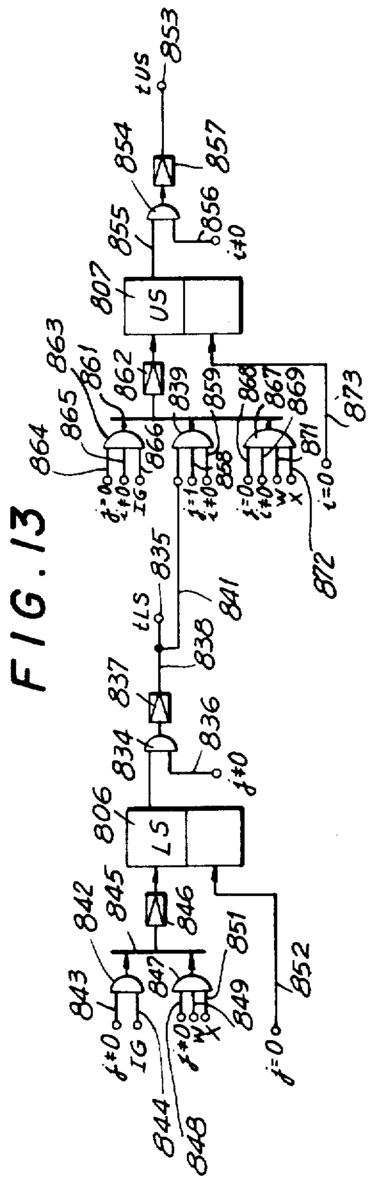
FIG. 13 is a circuit diagram of part of the embodiment of FIGS. 11A and 11B.

The flip flop 806 of FIG. 13 functions to produce the signal *t*LS. When the digit *j* of the register 13' of FIG. 11A is not zero, an AND-gate 834 is switched to its conductive condition and the signal *t*LS is provided at a terminal 835. The AND-gate 834 has an input connected to the set output of the flip flop 806 and an input lead 836 which receives the signal $j\neq 0$. The output of the AND-gate 834 is connected to the terminal 835 via an amplifier 837 and a lead 838. The output of the AND-gate 834 is also connected to an input of an AND-gate 839 via a lead 841 and the amplifier 837.

An AND-gate 842 has an input lead 843 which is supplied with the signal $j\neq 0$ and an input lead 844 which is supplied with a signal IG. The AND-gate 842 has an output connected to the set input of the flip flop 806 via an OR-gate 845 and an amplifier 846. An AND-gate 947 has an input lead 848 which is supplied with a signal $j\neq 0$, an input lead 849 which is supplied with a signal W and an input lead 851 which is supplied with a signal X. The output of the AND-gate 847 is connected to the set input of the flip flop 806 via the OR-gate 845 and the amplifier 846. A signal $j=0$, is supplied to the reset input of the flip flop 806 via a lead 852.

The flip flop 806 is switched to its set condition when either one of the AND-gates 842 and 847 is switched to its conductive condition. The AND-gate 842 is switched to its conductive condition by signals in its input leads 843 and 844 when the digit *j* of the register 13' of FIG. 11A is not zero and when the flip flop 804 of FIG. 12 in its set condition so that a signal IG is in the input lead 844. The AND-gate 847 is switched to its conductive condition by signals in each of its input leads 848, 849 and 851, when the digit *j* of the register 13' of FIG. 11A is not zero and when each of the flip flops 802 and 803 of FIG. 12 is in its set condition so that the signals W and X are supplied to said AND-gate. The flip flop 806 is reset via the lead 852 when the digit *j* of the register 13' of FIG. 11A is zero. The signal *t*LS provided in the foregoing manner is transferred to the memory register of FIGS. 14A, 14B and the terminal *t*LS of FIG. 11A is utilized to institute the shift to the left.

The signal *t*US, utilized to initiate the shift upward, when it is applied to the memory register of FIGS. 14A, 14B and to the terminal *t*US of FIG. 11A, is provided by the flip flop 807 of FIG. 13. The flip flop 807 provides the signal *t*US at a terminal 953 when said flip flop is in its set condition and when the digit *i* of the register 13 of FIG. 11A is not zero. An AND-gate 854 has an input lead 855 connected to the set output of the flip flop 806 and an input lead 856 which is supplied with a signal $i\neq 0$. The output of the AND-gate 854 is connected to the terminal 853 via an amplifier 857.

The AND-gate 839 has an input lead connected to the lead 841, as hereinbefore indicated, an input lead 858 to which a signal $j=1$ is supplied and an input lead 859 to which a signal $i\neq 0$ is supplied. The output of the AND-gate 839 is connected to the set input of the flip flop 807 via an OR-gate 861 and an amplifier 862. An AND-gate 863 has an input lead 864 to which the signal $j=0$ is supplied, an input lead 865 to which the signal $i \neq 0$ is supplied and an input lead 866 to which the signal IG is supplied. The output of the AND-gate 864 is connected to the set input of the flip flop 807 via the OR-gate 861 and the amplifier 862.

An AND-gate 867 has an input lead 868 to which the signal $j=0$ is supplied, an input lead 869 to which the signal $i \neq 0$ is supplied, an input lead 871 to which an input signal W is supplied and an input lead 872 to which an input signal X is supplied. The output of the AND-gate 867 is connected to the set input of the flip flop 807 via the OR-gate 861 and the amplifier 862. A lead 873 supplies the signal $i=0$ to the reset input of the flip flop 807.

The input lead 856 of the AND-gate 854 provides a signal in accordance with the zero check circuit 112 of FIG. 11A. The flip flop 807 is switched to its set condition when one of the AND-gates 863, 839 and 867 is switched to its conductive condition. The AND-gate 863 is switched to its conductive condition when a signal is supplied to each of its input leads 864, 865 and 866. This is the case when the digit $j$ of the register 13' of FIG. 11A is zero, the digit $i$ of the register 13 of FIG. 11A is not zero and the flip flop 804 of FIG. 12 is in its set condition so that it provides the signal IG.

The AND-gate 839 is switched to its conductive condition when a signal is supplied to each of its input leads 841, 858 and 859. This is the case, when the signal $t$LS is provided by the flip flop 806, when the digit $j$ of the register 13' of FIG. 11A is equal to 1 and when the digit $i$ of the register 13 of FIG. 11A is not equal to zero. The AND-gate 867 is in its conductive condition when a signal is supplied to each of its input leads 868, 869, 871 and 872. This is the case, when $j$ of the register 13' of FIG. 11A is zero, when $i$ of the register 13 of FIG. 11A is not zero, when the flip flop 802 of FIG. 12 is in its set condition so that it supplies the signal W and when the flip flop 803 of FIG. 12 is in its set condition so that it supplies the signal X. The flip flop 807 is reset via the lead 873 when the digit $i$ of the register 13 of FIG. 11A is zero.

Figure 15A:
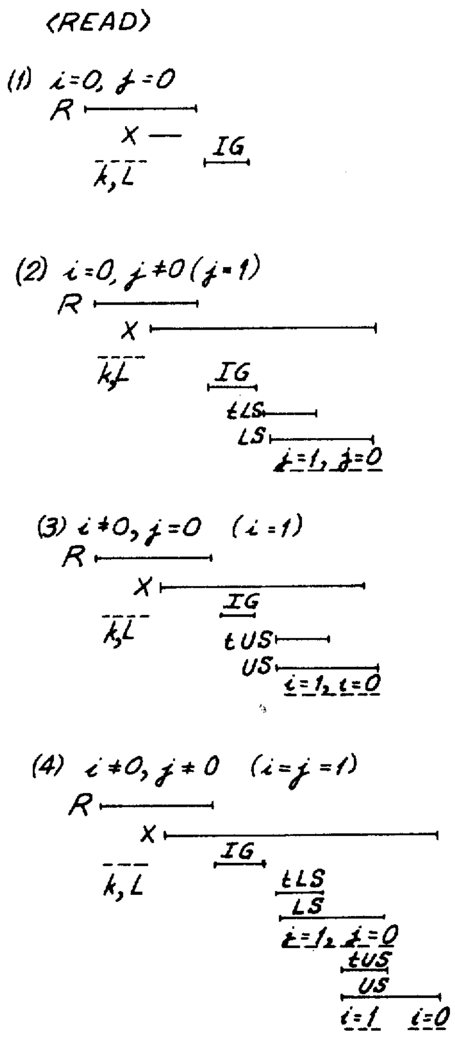
FIG. 15A is a graphical presentation of the read-out operations of the memory apparatus of the present invention.
Figure 15B:
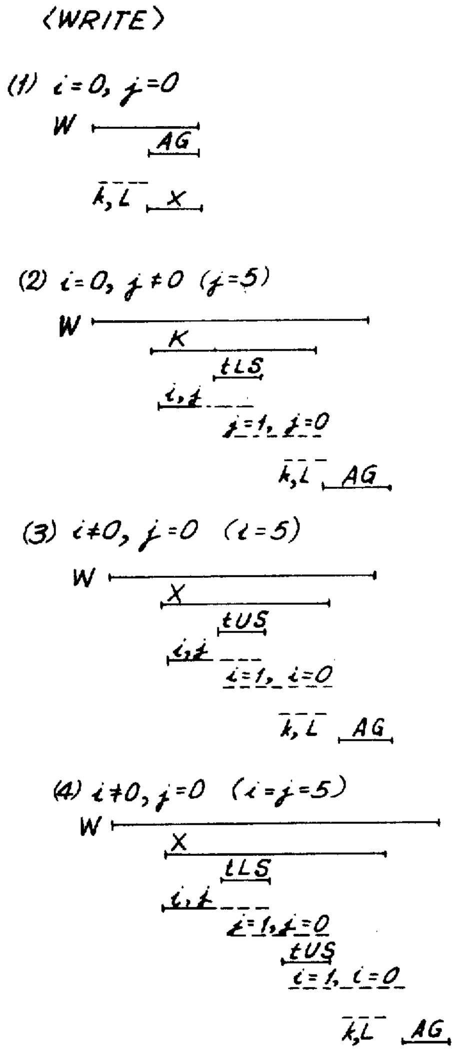
FIG. 15B is a graphical presentation of the write-in operations of the memory apparatus of the present invention.

FIGS. 15A and 15B are time charts which illustrate the operation of the circuits of FIGS. 11A, 11B, 12 and 13. FIG. 15A is a time chart for the read-out of information and FIG. 15B is a time chart for the write-in of information.

In the first read-out case, when $i=0$ and $j=0$, a signal is supplied to the input lead 808 of FIG. 12 via the read terminal and the flip flop 801 is switched to its set condition. This results in the next succeeding flip flop 803 being switched to its set condition. When the flip flop 803 is switched to its set condition, the flip flop 801 is switched to its reset condition and the flip flop 804 is switched to its set condition. When the flip flop 804 is in its set condition, the terminal IG of the memory register of FIGS. 14A, 14B receives the signal IG and the AND-gates 98 and 99 of FIG. 11A are opened. The signal is thus read out of the core matrix or storage 1 (FIG. 8) and is transferred into the memory register without modification.

In the second read-out case, when $i=0$ and $j \neq 0$ ($j=1$), the shift to the left is performed, after the read-out into the memory register, as indicated in the first case. That is, when $j$ is stored in the $jr$ register 13' of FIG. 11A, the signal $j \neq 0$ is detected by the zero check circuit 112' of FIG. 11A and a signal $j \neq 0$ is supplied to the input leads 843, 848 and 836 of FIG. 13. Since the flip flop 804 is in its set condition, the AND-gate 842 is switched to its conductive condition and the flip flop 806 is switched to its set condition. The signal $t$LS is thus supplied to the AND-gate 121' of the complement circuit 113' of FIG. 11A and the contents of the $jr$ register 13' of FIG. 11A are transferred via the arithmetic circuit 119'. Thus, 1 is subtracted from the contents $j$ of the $jr$ register 13' and the difference $j-1$ is provided. Since 1 is subtracted from $j$, $j$ becomes zero and the zero check circuit 112' of FIG. 11A indicates zero, so that the flip flop 806 of FIG. 13 is switched to its reset condition. At the same time, since $i=0$ and $j=0$, the AND-gate 823 is switched to its conductive condition, so that the flip flop 803 of FIG. 12 is switched to its reset condition, and all the flip flops are returned to their initial reset condition. When the digit $j$ is greater than 1, it is successively subtracted from $j$ and the shift to the left is successively performed until $j$ becomes zero.

In the third read-out case, when $i \neq 0$ and $j=0$ ($i=1$), the shift upward is performed in the same manner as in the foredescribed second case. In the third case, the flip flop 807 of FIG. 13 is in its set condition.

In the fourth read-out case, when $i \neq 0$ and $j \neq 0$ ($i=j=1$), both operations as described hereinbefore with reference to the second and third cases, are performed. That is, the shift to the left is performed first and the shift upward is then performed. This is further elucidated by noting the connections of the flip flop 806 and of the flip flop 807 of FIG. 13. When $j$ becomes equal to 1, the shift upward is initiated.

In the first write-in case, when $i=0$ and $j=0$, a write signal is supplied to the input lead 814 of FIG. 12 and switches the flip flop 802 to its set condition. It is necessary that the same shift function be performed before write-in as after read-out. After read-out, the shift upward and the shift to the left are performed by the information digits $i$ and $j$ themselves, whereas before write-in the shift upward and the shift to the left are performed by the informations for digits which are the complements from 6 of the informations of digits $i$ and $j$. Only the arithmetic circuit 119 and the arithmetic circuit 119' are utilized. All the circuits for shifting upward and shifting to the left are utilized, so that the complements of the contents of the $ir$ register 13 and the $jr$ register 13' are reserved. Since the digits are written in in accordance with a 6 unit system, the complement of 6 is utilized throughout.

In accordance with the present invention, it is possible to perform the shift function at the time of write-in by the use of only the arithmetic circuits 119 and 119' and the shift upward and shift to the left circuits. Since the signals W and $\overline{X}$ are provided, the AND-gates 116 and 116' of FIG. 11A are switched to their conductive condition and transfer the complements of the contents of the registers 13 and 13' back into said registers. This function is performed not only in the first case, when $i=0$, but in all the cases. Since $i=0$ and $j=0$, $i$ and $j$ may be so expressed even when the digits are converted into their complements. The flip flop 803 of FIG. 12 is switched to its set condition, and the flip flop 805 is switched to its set condition as the same time by the signals $i=0$ and $j=0$. In other words, the flip flop 805 is switched to its set condition by the AND-gate 824, which is switched to its conductive condition when $i=0$ and $j=0$. When $i \neq 0$ and $j \neq 0$, the shift function is performed, as hereinafter described. When the flip flop 805 is switched to its set condition, the contents of the memory register of FIG. 14A, 14B are transferred to the core storage or core matrix 1 and stored therein without modification. The terminal of the memory register of FIGS. 14A, 14B which provides the signal AG provides such signal and the AND-gates 501, 505, 500, and so on to 555, of FIGS. 14A, 14B are switched to their conductive condition and the contents of the corresponding flip flops, which are all the flip flops of FIGS. 14A, 14B, are transferred as outputs.

In the second write-in case, when $i=0$ and $j \neq 0$ ($j=5$, which is the complement of 1), the flip flop 802 of FIG. 12 is switched to its set condition by a write-in signal supplied to the input lead 814 and the flip flop 803 is switched to its set condition. During this operation, as hereinbefore described with reference to the first case, the complement unit 115' of FIG. 11A functions to provide the complement of the digit 1, which is 5, and which is transferred back to the *jr* register 13'. Since the flip flop 803 is in its set condition, and since *j* is still not equal to zero so that $j \neq 0$, the flip flop 806 of FIG. 13 is switched to its set condition and shifting to the left is performed. When the arithmetic circuit 119' of FIG. 11A has operated once, the contents of the *jr* register 13' become zero, so that the zero check circuit 112' is operated, $j=0$ and the flip flop 806 is reset via the lead 852. Since *i* and *j* may then be expressed as $i=0$ and $j=0$, the flip flop 805 is switched to its set condition and the contents of the memory register of FIGS. 14A, 14B are written into the corresponding real screen without modification. When the flip flop 805 is in its set condition, the flip flop 802 is switched to its reset condition and the write-in cycle is completed.

In the third write-in case, when $i \neq 0$ and $j=0$ ($i=5$, which is the complement of 1), the operation is the same as in the second case, as hereinbefore described.

In the fourth write-in case, when $i \neq 0$ and $j \neq 0$ ($i=j=5$, which is the complement of 1), the operation is the same as in the second and third cases, as hereinbefore described.

It is obvious from the foregoing description, that it is possible to read-out the entire eye screen, which includes the address in the upper left hand corner, by the designation of the address of a single unit.

Figure 19:
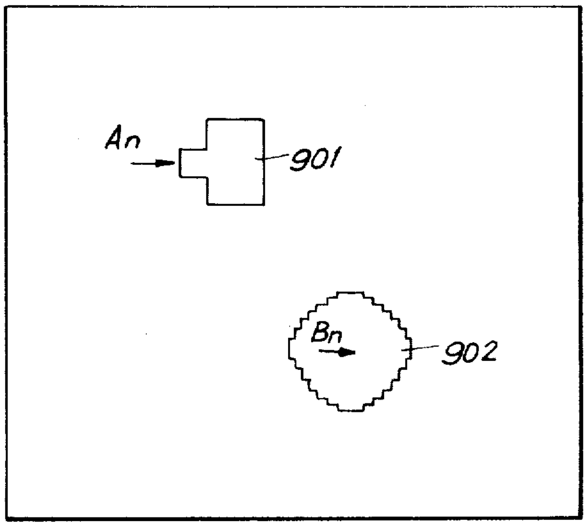
FIG. 19 is a schematic diagram of different configurations of the screen of the present invention.

Although the eye screen is indicated as rectangular, it may be provided with any suitable configuration by designing the hardware correspondingly. FIG. 19 illustrates the imaginary plane. The eye screen may be either polygonal in configuration, as shown by 901 in FIG. 19, or essentially curvilinear or circular, as shown by 902 in FIG. 19. It is also possible to vary the hardware in a manner whereby the eye screen *n* may be derived from the imaginary plane in the configuration of 901 when a signal A*n* is designated and the eye screen *n* may be derived from the imaginary plane in the configuration of 902 when a signal B*n* is provided.

Figure 20:
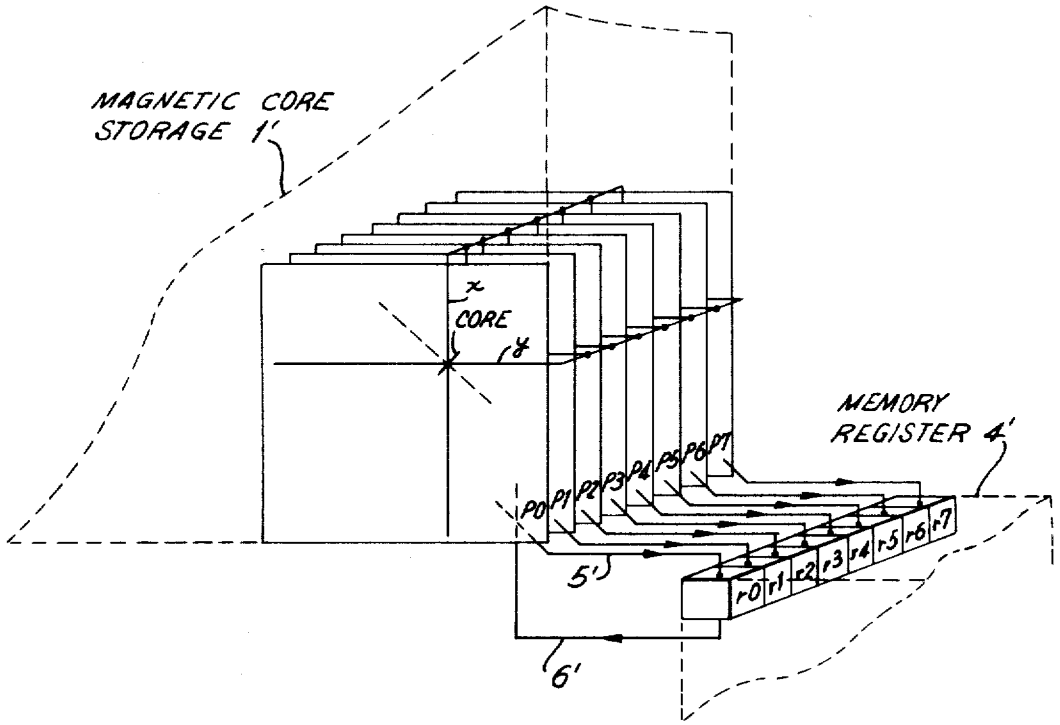
FIG. 20 is a block diagram of a modification of the memory apparatus of the present invention to three dimensions.

If it is assumed that the lead of the storage units comprises N bits of information, each real screen *r*, *s* comprises N sheets or planes of core matrices each of which includes a sense circuit. The coordinates *kr*, L*s* for selecting the information are supplied to the N sheets of core matrices uniformly. The memory register also comprises N units corresponding to the N sheets or planes of core matrices, so that the real screen may be expanded in a manner whereby a three-dimensional pattern of information of constant depth may be stored therein. FIG. 20 illustrates one screen of such a modification.

In FIG. 20, eight sheets or planes of core matrices P0, P1, P2, P3, P4, P5, P6 and P7 are each connected to a corresponding one of a plurality of flip flops which comprise the memory register 4. Thus, a flip flop ***r*0 is connected to the core matrix sheet P0, a flip flop *r*1 is connected to the core matrix sheet P1, a flip flop *r*2 is connected to the core matrix sheet P2, a flip flop *r*3 is connected to the core matrix sheet P3, a flip flop *r*4 is connected to the core matrix sheet P4, a flip flop *r*5 is connected to the core matrix sheet P5, a flip flop *r*6 is connected to the core matrix sheet P6 and a flip flop *r*7 is connected to the core matrix sheet P7**.

Since there are eight core matrix sheets in the modification of FIG. 20, $N=8$. The magnetic core storage or matrices 1', the memory register 4' and the leads 5' and 6' correspond to the magnetic core storage 1, the memory register 4 and the leads 5 and 6 of FIG. 8. The operation of the core matrices or core storage 1' is by coincidence of the currents flowing through *x* and *y* leads, only part of which are indicated in FIG. 20, and each of which is connected to each of the core matrix sheets. The output signals are provided via the N sense leads 5'. Write-in is performed via inhibit leads. Only a single inhibit lead 6' connected to the core matrix sheet or plane P0 is shown in FIG. 20, in order to maintain the clarity of illustration, although such inhibit leads are connected to each of the core matrices.

Each of the storage units may comprise *a* times *b* bits, so that two sides of the rectangule are *a* and *b* in another modification of the memory apparatus of the present invention. In such a modification, equation 1 must be amended as follows:

$$\left.\begin{aligned} f(k, L, i, j) &= k \text{ times } m \text{ times } a+i \\ g(k, L, i, j) &= L \text{ times } n \text{ times } b+j \end{aligned}\right\} \quad (3)$$

Equation 2 need not be changed, although the number of real screens is changed from *m* times *n* to *m* times *a* times *n* times *b*. In accordance with such variation, the number of bits of the memory register is also increased.

The memory apparatus of the present invention may store information of other forms, although it is particularly suited for storing information patterns. The memory apparatus of the present invention may also store information in general or in program form and may be utilized in many different effective methods.

As indicated by the foregoing descriptions, the memory apparatus of the present invention functions to prepare an imaginary memory plane for storing a two-dimensional information pattern and a basic or fundamental information pattern, which is the eye screen, which covers the imaginary plane and provides means for utilizing the address occupied by a specific unit of the basic information pattern. The specific unit of the basic information pattern is, for example, a unit in the upper left-hand corner of the matrix or pattern, in the disclosed embodiment of the present invention, and is utilized to select the entire basic information pattern including the unit itself. In accordance with the present invention, either a two-dimensional information pattern or a three-dimensional information pattern may be selected by the utilization of a single address.

While the invention has been described by means of specific examples and in a specific embodiment, I do not wish to be limited thereto, for obvious modifications will occur to those skilled in the art without departing from the spirit and scope of the invention.

I claim:

1. A pattern memory device for storing an information pattern without modifying the positional relation between two arbitrary units included in said pattern, said pattern memory device comprising
   - memory apparatus storing said pattern, said units stored by said memory apparatus each having addresses assigned thereto;
   - circuit means for selecting a basic field of predetermined configuration including means for selecting an arbitrary field of said pattern stored in said memory apparatus; and
   - control means coupled to said memory apparatus for write-in and read-out of the arbitrary field in said memory apparatus, said control means designating one of said addresses whereby said circuit means selects a basic field of predetermined configuration including the designated address.

2. A pattern memory device as claimed in claim 1, wherein said memory apparatus comprises a memory divided into planar fields of predetermined configuration, each of said planar fields having predetermined coordinates (*k*, L), each of said planar fields having storage units having predetermined coordinates (*i*, *j*), each storage unit of said memory plane being represented by said coordinates (*k*, L, *i*, *j*); said circuit means selects a predetermined coordinate point (*k*, L, *i'*, *j'*) on said memory plane, and said control means writes-in and reads-out of an arbitrary field of which the selected coordinate point is the reference address, said arbitrary field having the same configuration and size as said predetermined configuration but without direct relationship to said planar fields.

3. A pattern memory device as claimed in claim 2.

wherein the memory plane of said memory apparatus comprises a plurality of memory screens determined by only the coordinates (*i, j*) of the corresponding storage units of all the planar, storage units (*i, j*) of the coordinates (*k*, L) of said planar are determined and arranged as storage units (*k*, L) on said memory screens, and said control means separately and simultaneously writes-in and reads-out the memory screens of said memory plane.

4. A pattern memory device as claimed in claim 3, wherein said control means writes-in and reads-out the storage units (*k*, L) of the memory screens on the basis of equations $$k_i = \begin{cases} k & (i' \leqq i) \\ k+1 & (i' \geqq i) \end{cases}$$

$$L_j = \begin{cases} L & (j' \leqq j) \\ L+1 & (j' \geqq j) \end{cases}$$

wherein $k_i$, $L_j$ are the coordinates of storage units written-in to and read-out from the coordinates *i, j* of the memory screens fields and *k*, L, *i'*, *j'* are the coordinates of storage units selected.

References Cited

UNITED STATES PATENTS

| | | | |
|---|---|---|---|
| 3,090,041 | 5/1963 | Dell | 340—324 |
| 3,106,698 | 10/1963 | Unger | 340—172.5 |
| 3,305,841 | 2/1967 | Schwartz | 340—172.5 |
| 3,366,931 | 1/1968 | Githens | 340—172.5 |
| 3,387,272 | 6/1968 | Evans et al. | 340—172.5 |
| 3,402,398 | 9/1968 | Koerner et al. | 340—172.5 XR |
| 3,416,146 | 12/1968 | Bremer | 340—172.5 XR |

PAUL J. HENON, Primary Examiner

H. E. SPRINGBORN, Assistant Examiner